(12) United States Patent
Li et al.

(10) Patent No.: US 11,548,349 B2
(45) Date of Patent: Jan. 10, 2023

(54) THERMAL MANAGEMENT SYSTEM AND ELECTRIC VEHICLE HAVING THE SAME

(71) Applicant: GUANGZHOU AUTOMOBILE GROUP CO., LTD., Guangzhou (CN)

(72) Inventors: Xiaohui Li, Sunnyvale, CA (US); Qin Yang, Sunnyvale, CA (US); Bozhi Yang, Sunnyvale, CA (US); Meng Yao, Sunnyvale, CA (US); Chen Zhang, San Jose, CA (US); Meng Wang, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 106 days.

(21) Appl. No.: 17/337,229

(22) Filed: Jun. 2, 2021

(65) Prior Publication Data

US 2022/0388368 A1 Dec. 8, 2022

(51) Int. Cl.
*B60H 1/00* (2006.01)
*B60H 1/32* (2006.01)

(52) U.S. Cl.
CPC ........... *B60H 1/00392* (2013.01); *B60H 1/00* (2013.01); *B60H 1/00278* (2013.01);
(Continued)

(58) Field of Classification Search
CPC .. B60H 1/00392; B60H 1/00; B60H 1/00278; B60H 1/00328; B60H 1/00428;
(Continued)

(56) References Cited

U.S. PATENT DOCUMENTS 8,517,087 B2 * 8/2013 Zeigler .............. B60H 1/00907
62/324.1
8,899,062 B2 * 12/2014 Kadle ....................... F28F 3/08
62/333
(Continued)

FOREIGN PATENT DOCUMENTS

CN 110315961 A * 10/2019 ............... B60H 1/00
CN 112543709 A 3/2021
(Continued)

*Primary Examiner* — Ljiljana V. Ciric
(74) *Attorney, Agent, or Firm* — ScienBiziP, P.C.

(57) ABSTRACT

A thermal management system includes a refrigerant loop, a motor coolant loop, and a battery coolant loop. The refrigerant loop includes a first refrigerant main-line, a second refrigerant main-line, a first refrigerant branch, and a second refrigerant branch. The first refrigerant main-line includes a compressor, the second refrigerant main-line includes a cabin condenser, the first refrigerant branch includes a cabin evaporator, the second refrigerant branch includes a radiator. The first refrigerant main-line and the second refrigerant main-line selectively communicate with one of the first and second refrigerant branches. The battery coolant loop includes a coolant main-line, a first coolant branch connected to the cabin evaporator, a second coolant branch connected to the cabin condenser, and a third coolant branch. The coolant main-line selectively communicates with at least one of the first to third coolant branches. The battery coolant loop connects to the motor coolant loop in series or in parallel.

20 Claims, 26 Drawing Sheets

(52) U.S. Cl.
CPC ..... *B60H 1/00328* (2013.01); *B60H 1/00428* (2013.01); *B60H 1/00642* (2013.01); *B60H 1/3208* (2013.01); *B60H 2001/003* (2013.01); *B60H 2001/00307* (2013.01); *B60H 2001/3291* (2013.01); *B60H 2001/3292* (2013.01)

(58) Field of Classification Search
CPC .............. B60H 1/00642; B60H 1/3208; B60H 2001/003; B60H 2001/00307; B60H 2001/3291; B60H 2001/3292
See application file for complete search history.

(56) References Cited

U.S. PATENT DOCUMENTS

| | | | | |
|---|---|---|---|---|
| 10,625,563 | B2* | 4/2020 | Kim | B60H 1/00392 |
| 11,007,850 | B2* | 5/2021 | Kim | B60H 1/143 |
| 11,021,041 | B2* | 6/2021 | He | B60H 1/00507 |
| 11,186,137 | B2* | 11/2021 | Kim | B60H 1/32284 |
| 11,458,812 | B2* | 10/2022 | Jeong | B60H 1/00907 |
| 2010/0293966 | A1* | 11/2010 | Yokomachi | B60H 1/00478 62/271 |
| 2014/0109613 | A1* | 4/2014 | Ohno | F25B 13/00 62/498 |
| 2014/0250929 | A1* | 9/2014 | Takahashi | F25B 41/24 62/115 |
| 2015/0027162 | A1* | 1/2015 | Ohno | F25B 41/20 62/527 |
| 2016/0107503 | A1* | 4/2016 | Johnston | B60H 1/00278 165/202 |
| 2017/0361677 | A1* | 12/2017 | Kim | H01M 10/663 |
| 2019/0176572 | A1* | 6/2019 | Kim | B60H 1/00921 |
| 2019/0351732 | A1* | 11/2019 | Rajaie | B60H 1/3227 |
| 2019/0351740 | A1* | 11/2019 | Filipkowski | B60H 1/32284 |
| 2021/0188043 | A1* | 6/2021 | Smith | B60H 1/00278 |
| 2022/0161630 | A1* | 5/2022 | Lindquist | B60K 1/00 |

FOREIGN PATENT DOCUMENTS

| | | | | |
|---|---|---|---|---|
| DE | 102020115992 A1 | * | 12/2020 | ......... B60H 1/00278 |
| EP | 1291206 A1 | * | 3/2003 | ......... B60H 1/00007 |
| EP | 2770275 A1 | * | 8/2014 | ......... B60H 1/00278 |
| EP | 2709864 B1 | * | 9/2014 | ......... B60H 1/00278 |
| JP | H05319077 A | * | 12/1993 | |
| WO | WO-2013136154 A1 | * | 9/2013 | ......... B60H 1/00271 |

* cited by examiner

THERMAL MANAGEMENT SYSTEM AND ELECTRIC VEHICLE HAVING THE SAME

FIELD

The subject matter herein generally relates to a thermal management system and an electric vehicle having the thermal management system.

BACKGROUND

An electric vehicle operates by using a motor that receives electricity from a battery and outputs power. Electric vehicles discharge very little carbon dioxide and generate very little noise. The motor of the electric vehicle has energy efficiency higher than that of internal combustion engine.

However, a driving range of the electric vehicle is reduced in cold weather. Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Implementations of the disclosure will now be described, by way of embodiments only, with reference to the drawings. It should be noted that the embodiments and the features of the present disclosure can be combined without conflict. Specific details are set forth in the following description to make the present disclosure to be fully understood. The embodiments are only portions of, but not all the embodiments of the present disclosure. Based on the embodiments of the present disclosure, other embodiments obtained by a person of ordinary skill in the art without creative efforts shall be within the scope of the present disclosure.

Unless defined otherwise, all technical and scientific terms used herein have the same meaning as commonly understood by one of ordinary skill in the art. The terms used herein in the specification of the present disclosure are only for describing the embodiments and are not intended to limit the present disclosure. The term "and/or" as used herein includes any combination of one or more related items.

Figure 1:
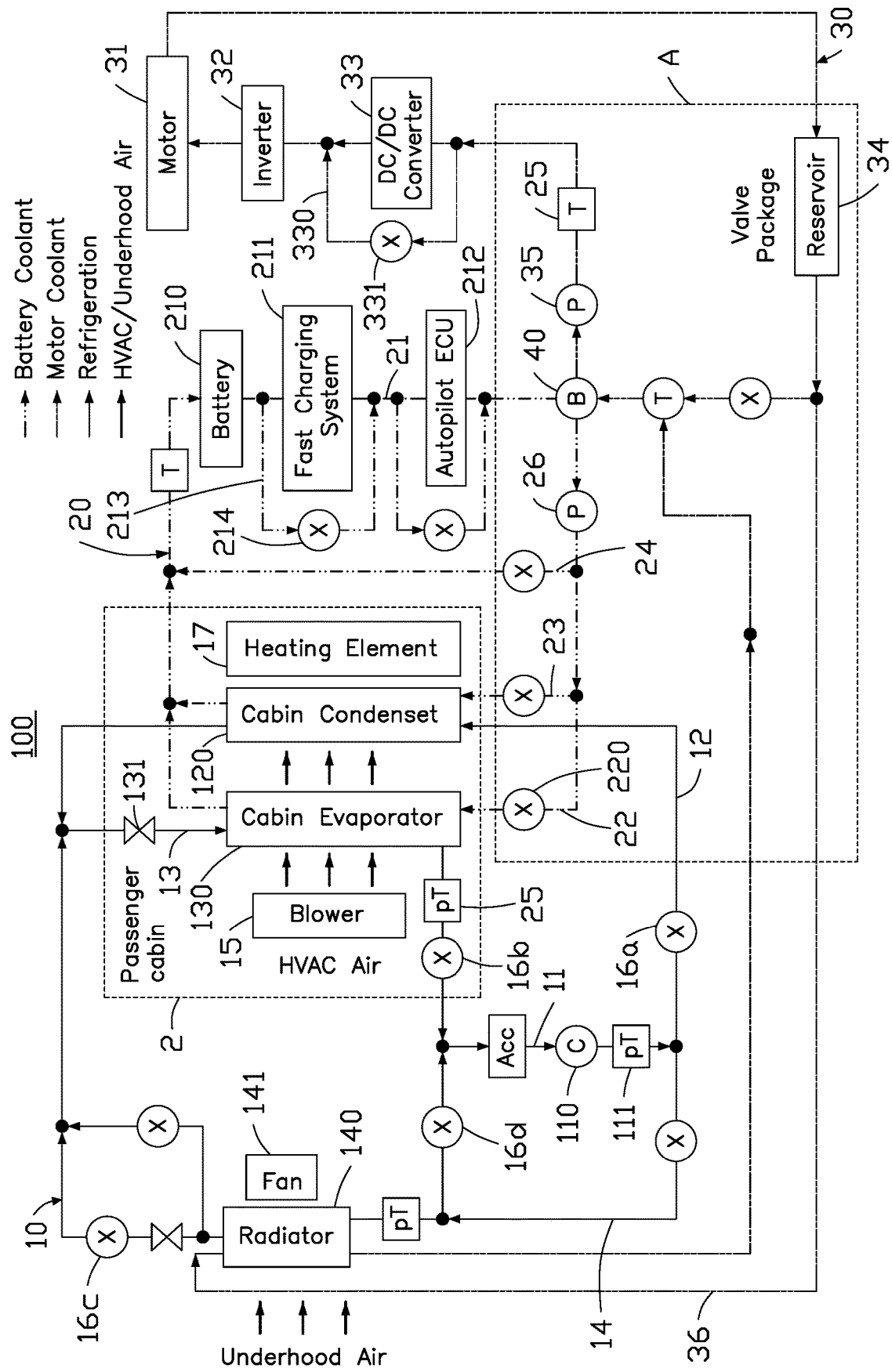
FIG. 1 is a diagrammatic view of a thermal management system according to an embodiment of the present disclosure.
Figure 26:
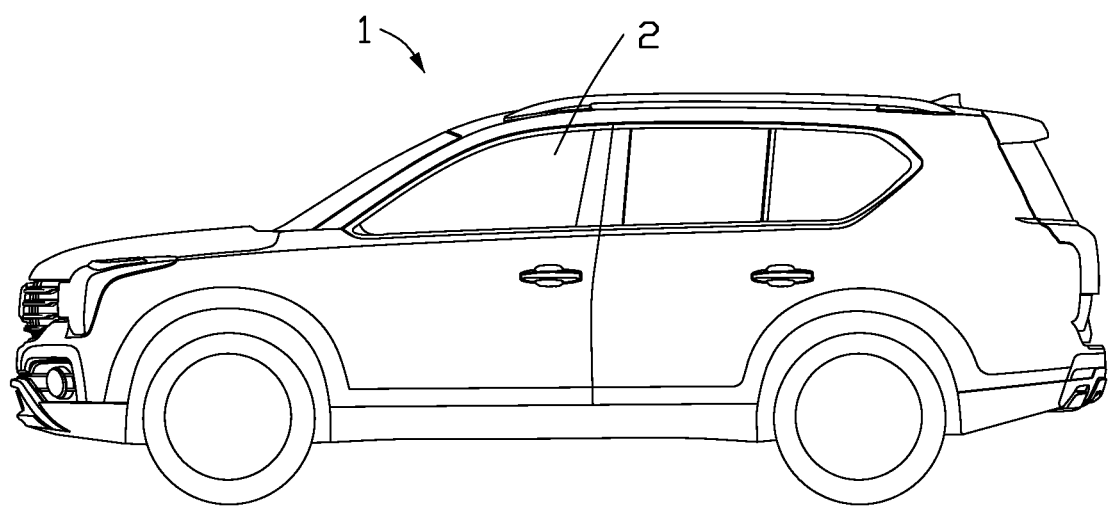
FIG. 26 is a diagrammatic view of an electric vehicle according to the present disclosure.

FIG. 1 illustrates an embodiment of a thermal management system 100, which can be applied in an electric vehicle 1 (shown in FIG. 26). The thermal management system 100 includes a refrigerant loop 10, a battery coolant loop 20, and a motor coolant loop 30.

The refrigerant loop 10 includes a first refrigerant main-line 11, a second refrigerant main-line 12, a first refrigerant branch 13, and a second refrigerant branch 14. The first refrigerant main-line 11 includes a compressor 110 that can compress the refrigerant. The second refrigerant main-line 12 includes a cabin condenser 120 that can condense the refrigerant and release heat. The first refrigerant branch 13 includes a cabin evaporator 130 that can evaporate the refrigerant and absorb heat. The cabin condenser 120 and the cabin evaporator 130 can be in air communication with a passenger cabin 2 of the electric vehicle 1. The second refrigerant branch 14 includes a radiator 140 that can function as an evaporator or a condenser. The radiator 140 is positioned such that it can absorb heat from and release heat to underhood air. Thus, the refrigerant loop 10 includes only three heat exchangers, that is, the cabin condenser 120, the cabin evaporator 130, and the radiator 140. The cost can thus be reduced.

In at least one embodiment, the refrigerant loop 10 further includes a blower 15. The blower 15 can blow the heat released by the cabin condenser 120 across the passenger cabin 2, thus facilitating air flows from the cabin condenser 130 to the passenger cabin 2.

The refrigerant loop 10 also includes a number of first shut-off valves 16a, 16b, 16c and 16d. Each of the first shut-off valves 16a, 16b, 16c and 16d can be operable between open and close to cause the first refrigerant main-line 11 and the second refrigerant main-line 12 to selectively communicate with one of the first refrigerant branch 13 and the second refrigerant branch 14. For example, the first shut-off valves 16a and 16b are opened and the first shut-off valves 16c and 16d are closed, so that the first refrigerant main-line 11, the second refrigerant main-line 12, and the first refrigerant branch 13 communicate to each other. Thus, the refrigerant can successively circulate in the compressor 110, the cabin condenser 120, and the cabin evaporator 130. The first shut-off valves 16a, 16c an 16d can also be opened and the first shut-off valve 16b can also be closed, so that the first refrigerant main-line 11, the second refrigerant main-line 12, and the second refrigerant branch 14 communicate with each other. Thus, the refrigerant can successively circulate in the compressor 110, the cabin condenser 120, and the radiator 140.

In at least one embodiment, each of the first refrigerant branch 13 and the second refrigerant branch 14 also includes an expansion valve 131. The expansion valve 131 is disposed between the cabin condenser 120 and the cabin evaporator 130, or between the cabin condenser 120 and the radiator 140. The expansion valve 131 can control a flow rate of the refrigerant into the cabin evaporator 130 or the radiator 140.

In at least one embodiment, each of the first refrigerant main-line 11, the first refrigerant branch 13, and the second refrigerant branch 14 further includes a temperature and pressure sensor 111. The temperature and pressure sensor 111 can sense a temperature value and a pressure value of the refrigerant passing through the first refrigerant main-line 11, the first refrigerant branch 13, or the second refrigerant branch 14.

The motor coolant loop 30 includes a powertrain system and a coolant reservoir 34. In at least one embodiment, the powertrain system includes a motor 31, an inverter 32, and a DC/DC converter 33. FIG. 1 shows the motor 31, the inverter 32, and the DC/DC converter 33 are connected in series. However, in other embodiments, the location of the motor 31, the inverter 32, and the DC/DC converter 33 may be changed. For example, the motor 31 and the inverter 32 may be connected in parallel. The coolant reservoir 34 can store a heat transfer fluid (for example, coolant). The motor coolant loop 30 can circulate the coolant through the motor 31, the inverter 32, and the DC/DC converter 33 under the function of a pump 35. When the coolant flows through the motor 31, the inverter 32, and the DC/DC converter 33, the heat generated by the motor 31, the inverter 32, and the DC/DC converter 33 is transferred to the coolant.

The battery coolant loop 20 includes a coolant main-line 21, a first coolant branch 22, a second coolant branch 23, and a third coolant branch 24. The coolant main-line 21 includes a power supply system. In at least one embodiment, the power supply system includes a battery 210, a fast charging system 211, and an autopilot electronic control unit (ECU) 212. FIG. 1 shows that the battery 210, the fast charging system 211, and the autopilot ECU 212 are connected in series. However, in other embodiments, the location of the battery 210, the fast charging system 211, and the autopilot ECU 212 can be varied. The battery 210 outputs electric energy. The fast charging system 211 charges the battery 210. Then, the inverter 32 of the motor coolant loop 30 supplies the electric energy from the battery 210 to drive the motor 31. The motor 31 outputs motive power to a wheel of the electric vehicle 1. The battery coolant loop 20 can circulate the coolant through the battery 210, the fast charging system 211, and the autopilot ECU 212 under the function of a pump 26. When the coolant flows through the battery 210, the fast charging system 211, and the autopilot ECU 212, the heat generated by the battery 210, the fast charging system 211, and the autopilot ECU 212 is transferred to the coolant.

In at least one embodiment, each of the battery coolant loop 20 and the motor coolant loop 30 further includes a temperature sensor 25. The temperature sensor 25 can sense a temperature value of the coolant passing through the battery coolant loop 20 or the motor coolant loop 30.

In at least one embodiment, the motor coolant loop 30 further includes a bypass path 330 connected to DC/DC converter 33. The bypass path 330 includes a third shut-off valve 331, which can be operable between open and close to allow the coolant to pass through or bypass the DC/DC converter 33 as needed. The battery coolant loop 20 can also include two bypass paths 213 connected to the fast charging system 211 and the autopilot ECU 212. Each of the bypass paths 213 includes a third shut-off valve 214, which can be operable between open and close to allow the coolant to pass through or bypass the fast charging system 211 and the autopilot ECU 212 as needed.

Each of the first coolant branch 22, the second coolant branch 23, and the third coolant branch 24 includes a second shut-off valve 220. Each second shut-off valve 220 can be operable between open and close to cause the coolant main-line 21 to selectively communicate with at least one of the first coolant branch 22, the second coolant branch 23, and the third coolant branch 24. In detail, the first coolant branch 22 is connected to the cabin evaporator 130, and thus can connect the cabin evaporator 130 to the coolant main-line 21. The second coolant branch 23 is connected to the cabin condenser 120, and can thus connect the cabin condenser 120 to the coolant main-line 21. The third coolant branch 24 can directly connect the upstream end of the coolant main-line 21 to its downstream end. Thus, each of the cabin evaporator 130 and the cabin condenser 120 not only functions as a heat exchanger between the refrigerant and the air, and also as a heat exchanger between the coolant and the refrigerant. That is, each of the cabin evaporator 130 and the cabin condenser 120 can allow heat transfer among three different fluids.

The battery coolant loop 20 and the motor coolant loop 30 are connected through a four-way valve 40. The four-way valve 40 includes two inlets and two outlets. Each inlet can be connected to one corresponding outlet, thereby allowing the battery coolant loop 20 to connect to the motor coolant loop 30 in series or in parallel. In detail, when the battery coolant loop 20 and the motor coolant loop 30 connect in series, the coolant can successively circulate in the battery coolant loop 20 and the motor coolant loop 30. When the battery coolant loop 20 and the motor coolant loop 30 connect in parallel, the battery coolant loop 20 and the motor coolant loop 30 fluidically separated from each other.

In at least one embodiment, the motor coolant loop 30 can further include a fourth coolant branch 36. The fourth coolant branch 36 can connect the radiator 140 to the motor coolant loop 30. Thus, the radiator 140 not only functions as a heat exchanger between the refrigerant and the air, and also as a heat exchanger between the coolant and the refrigerant. That is, the radiator 140 can also allow heat transfer among three different fluids.

Thus, the thermal management system 100 can form a valve package A having eight ports. Two ports of the valve package A can communicate with the motor coolant loop 30. Another port of the valve package A can communicate with the coolant main-line 21 of the battery coolant loop 20. Another three ports of the valve package A can communicate with first coolant branch 22, the second coolant branch 23, and the third coolant branch 24. The remaining two ports of the valve package A can communicate with the fourth coolant branch 36. Each of the eight ports of the valve package A is operable between open and close to change the direction of flow of the three fluids within the thermal management system 100.

The thermal management system 100 can operate in a plurality of modes depending on an ambient temperature, while different modes having different directions of flows of the three fluids within the thermal management system 100. For example, the thermal management system 100 can operate in a plurality of heating modes when the ambient temperature is low, thereby providing warm air to the passenger cabin 2. In at least one embodiment, fifteen heating modes are included. The working principles of the respective heating modes will be described as follows.

First Heating Mode

Figure 2:
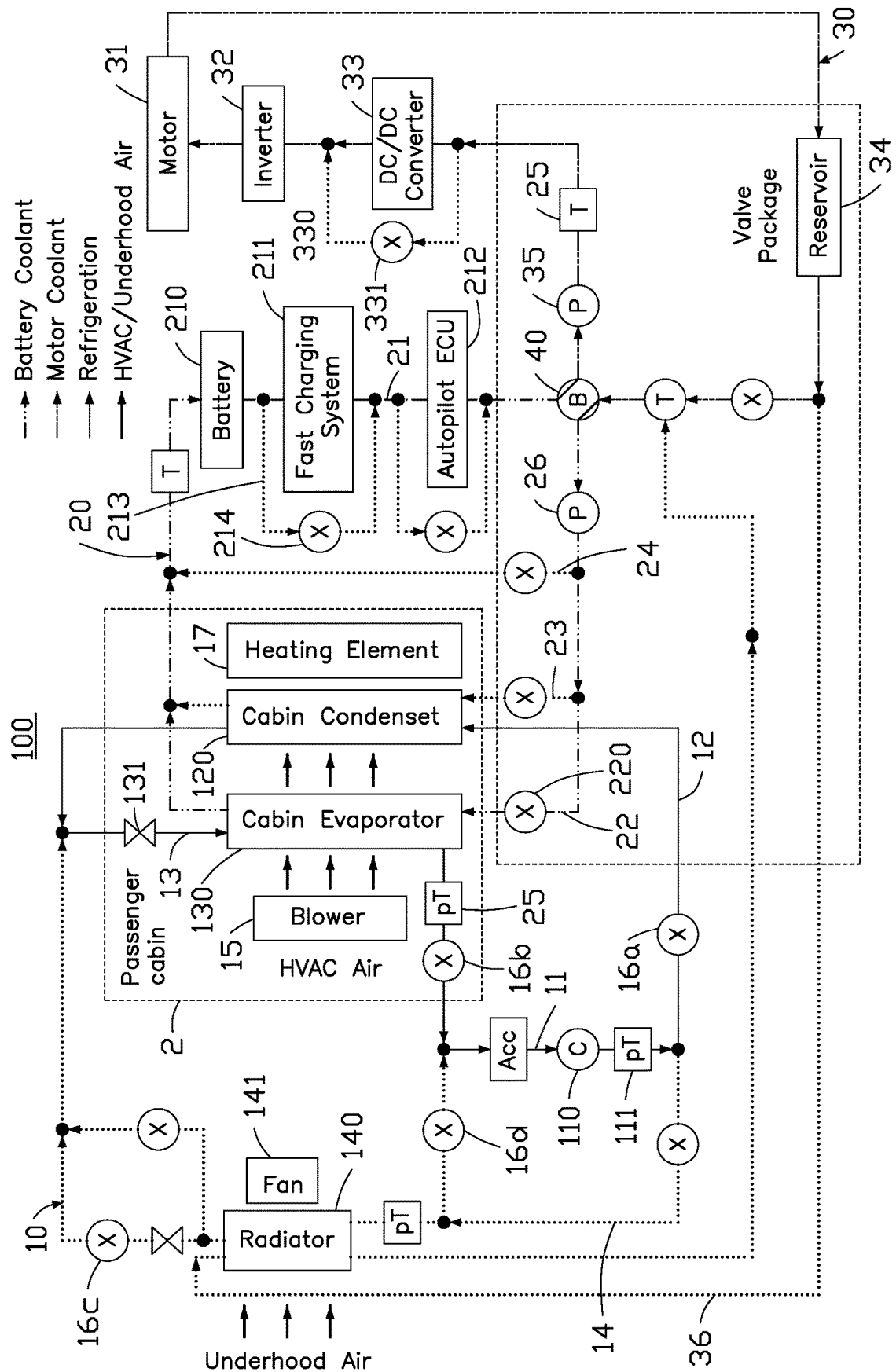
FIG. 2 is a diagrammatic view of the thermal management system of FIG. 1, operating in a first heating mode.

The thermal management system 100 can switch to the first heating mode at the ambient temperature lower than −10□. Referring to FIG. 2, the first refrigerant main-line 11, the second refrigerant main-line 12, and the first refrigerant branch 13 communicate to each other, so that the refrigerant can successively circulate in the first refrigerant main-line 11, the second refrigerant main-line 12, and the first refrigerant branch 13. The compressor 110 compresses a vapor of the refrigerant with low temperature and low pressure contained within the refrigerant loop 10 into a vapor with high temperature and high pressure. After passing through the cabin condenser 120, the refrigerant changes phase from vapor to liquid, and release heat to the passenger cabin 2. The blower 15 blows the heat across the passenger cabin 2. Thus, the passenger cabin 2 is warmed up. The refrigerant further changes phase from liquid to vapor after passing through the cabin evaporator 130. The vapor is then circulated back into the compressor 110. In at least one embodiment, the air in the passenger cabin 2 may change phase from vapor to liquid when passing through the cabin evaporator 130 and then be expelled out of the passenger cabin 2, thus, the first heating mode can also perform dehumidification of the air in the passenger cabin 2.

Furthermore, each inlet of the four-way valve 40 is connected to one corresponding outlet to allow the coolant main-line 21 of the battery coolant loop 20 to connect to the motor coolant loop 30 in series. The second shut-off valves 220 are operated to cause the first coolant branch 22 to connect the cabin evaporator 130 of the refrigerant loop 10 to the coolant main-line 21. Thus, the coolant can circulate in the coolant main-line 21, the motor coolant loop 30, and the first coolant branch 22. When the coolant flows through the cabin evaporator 130, the waste heat of the coolant is absorbed by the refrigerant flowing through the cabin evaporator 130, and further released to the passenger cabin 2 by the cabin condenser 120. Thus, a power of heat released to the passenger cabin 2 is equal to a sum of a power of the compressor 110 and a power of the waste heat.

When the thermal management system 100 works in the first heating mode at the ambient temperature lower than −10□, the refrigerant absorbs very little heat from the underhood air through the radiator 140. Almost 100% of the electric energy of the compressor 110 is converted into the heat to warm up the passenger cabin 2. Thus, a Coefficient of Performance (COP) of the thermal management system 100 is equal to 1.

Second Heating Module

Figure 3:
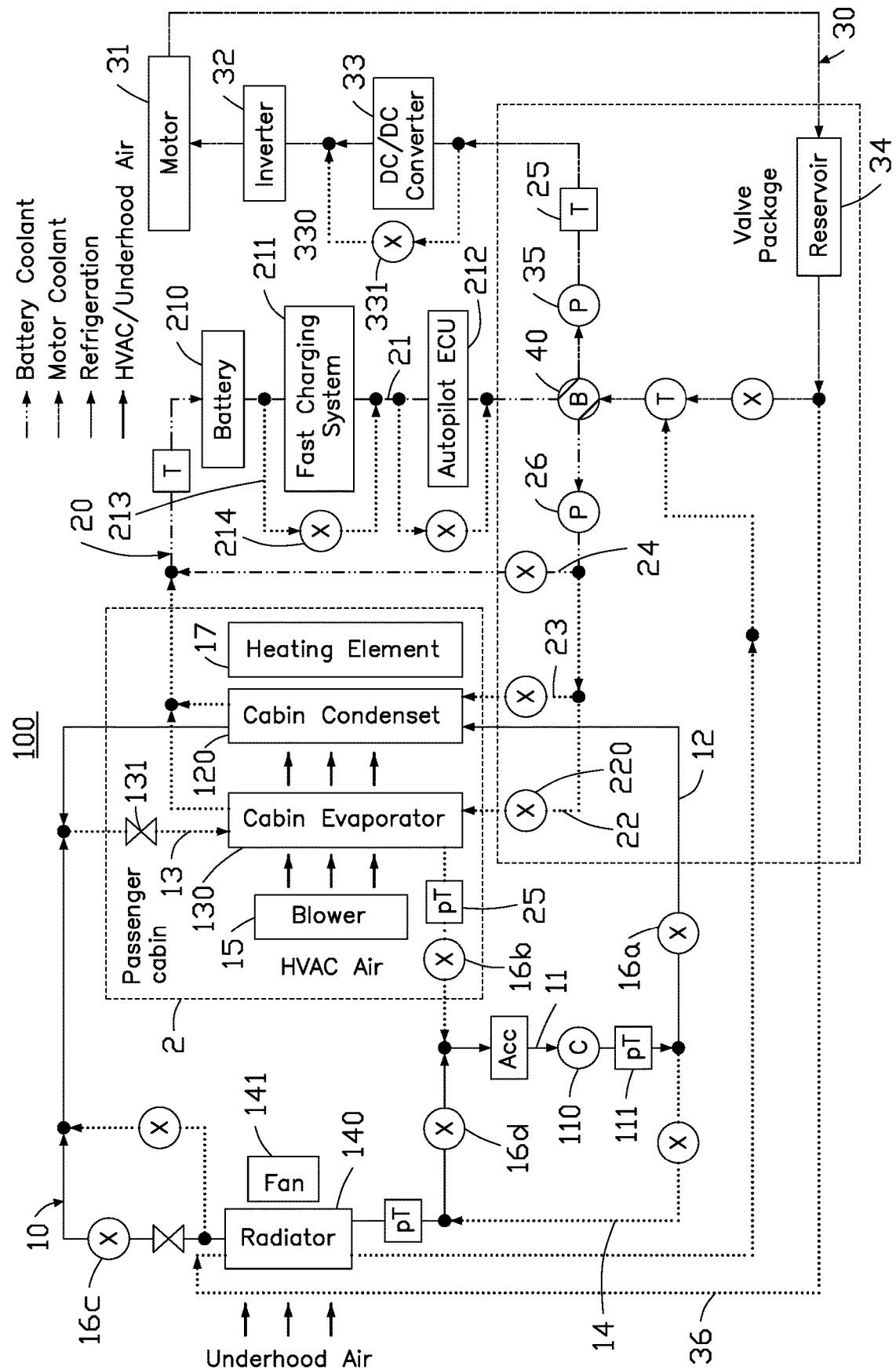
FIG. 3 is a diagrammatic view of the thermal management system of FIG. 1, operating in a second heating mode.

The thermal management system 100 can switch to the second heating mode at the ambient temperature higher than −10□ (for example, the ambient temperature is higher than −10□ and lower than 20□). Referring to FIG. 3, different from the first heating mode, the second refrigerant branch 14, instead of the first refrigerant branch 13, communicates with the first refrigerant main-line 11 and the second refrigerant main-line 12. In this case, the compressor 110 compresses a vapor of the refrigerant with low temperature and low pressure contained within the refrigerant loop 10 into a vapor with high temperature and high pressure. After passing through the cabin condenser 120, the refrigerant changes phase from vapor to liquid, and releases heat to the passenger cabin 2. The blower 15 blows the heat across the passenger cabin 2. The refrigerant further changes phase from liquid to vapor after passing through the radiator 140, that is, the radiator 140 functions as an evaporator. The vapor is then circulated back into the compressor 110.

Furthermore, since the ambient temperature is relatively high, the refrigerant, when passing through the radiator 140, can also absorb the heat from the underhood air. The heat can then be released into the passenger cabin 2 by the cabin condenser 120 to warm up the passenger cabin 2. Thus, the COP is higher than 1. In at least one embodiment, one or more fans 141 are positioned in front of the radiator 140. The amount of underhood air passing through the radiator 140 can be increased by the one or more fans 141.

Also different from the first heating mode, the third coolant branch 24, instead of the first coolant branch 22, communicates with the coolant main-line 21. Thus, the waste heat of the coolant can be used to warm up the battery 210.

Third Heating Mode

Figure 4:
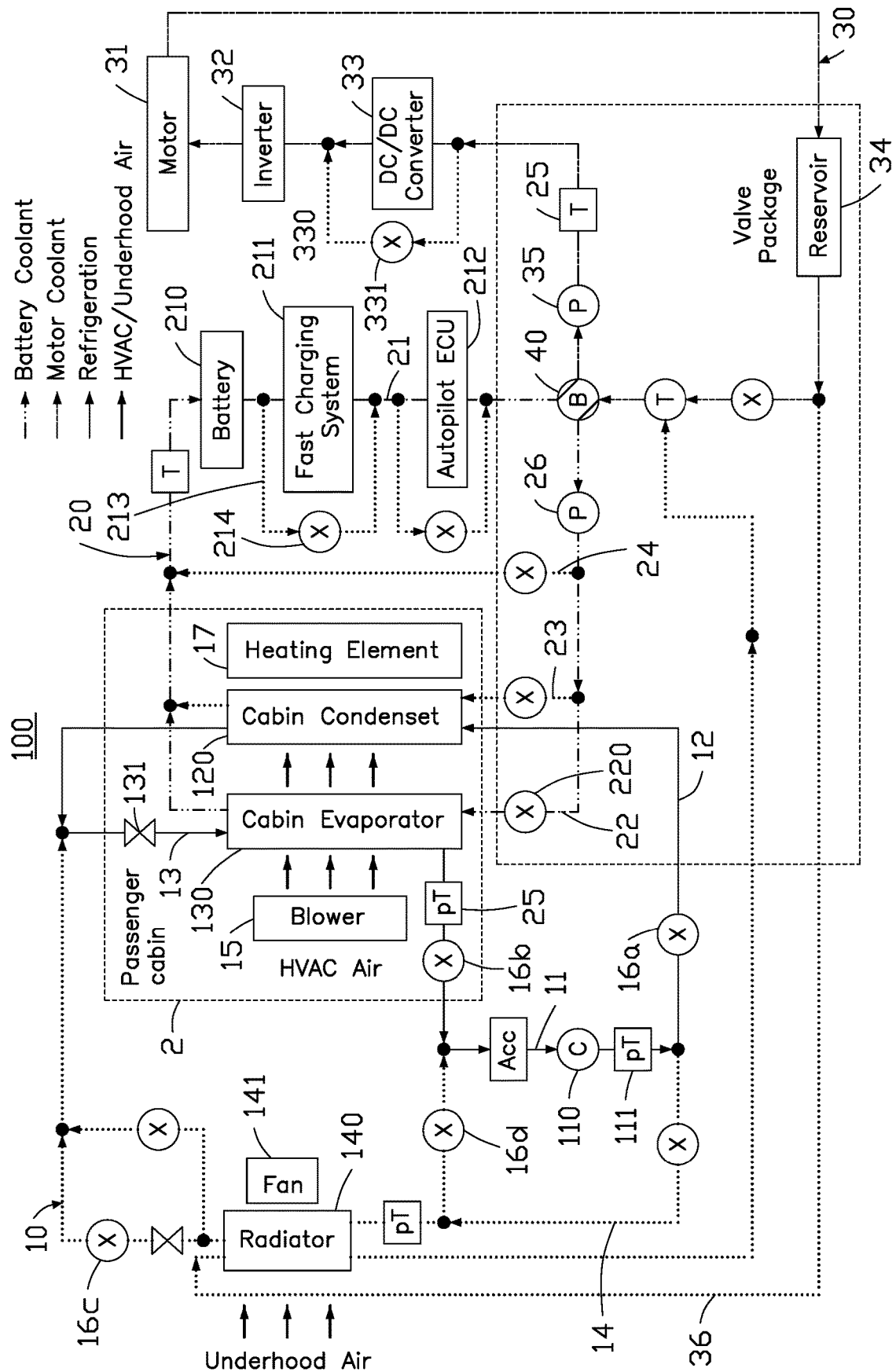
FIG. 4 is a diagrammatic view of the thermal management system of FIG. 1, operating in a third heating mode.

The thermal management system 100 can switch to the third heating mode at the ambient temperature lower than −10□. Referring to FIG. 4, different from the first heating mode, the blower 15 can work in a lower efficiency to generate heat, which can warm up the air in the passenger cabin 2. In addition, to improve the heating efficiency of the air in the passenger cabin 2, the refrigerant loop 10 of the third heating mode further includes at least one heating element 17. The heating element 17 can be in air communication with the passenger cabin 2, and can heat the air that flows to the passenger cabin 2. In at least one embodiment, the heating element 17 is a Positive Temperature Coefficient (PTC) thermistor.

Fourth Heating Mode

Figure 5:
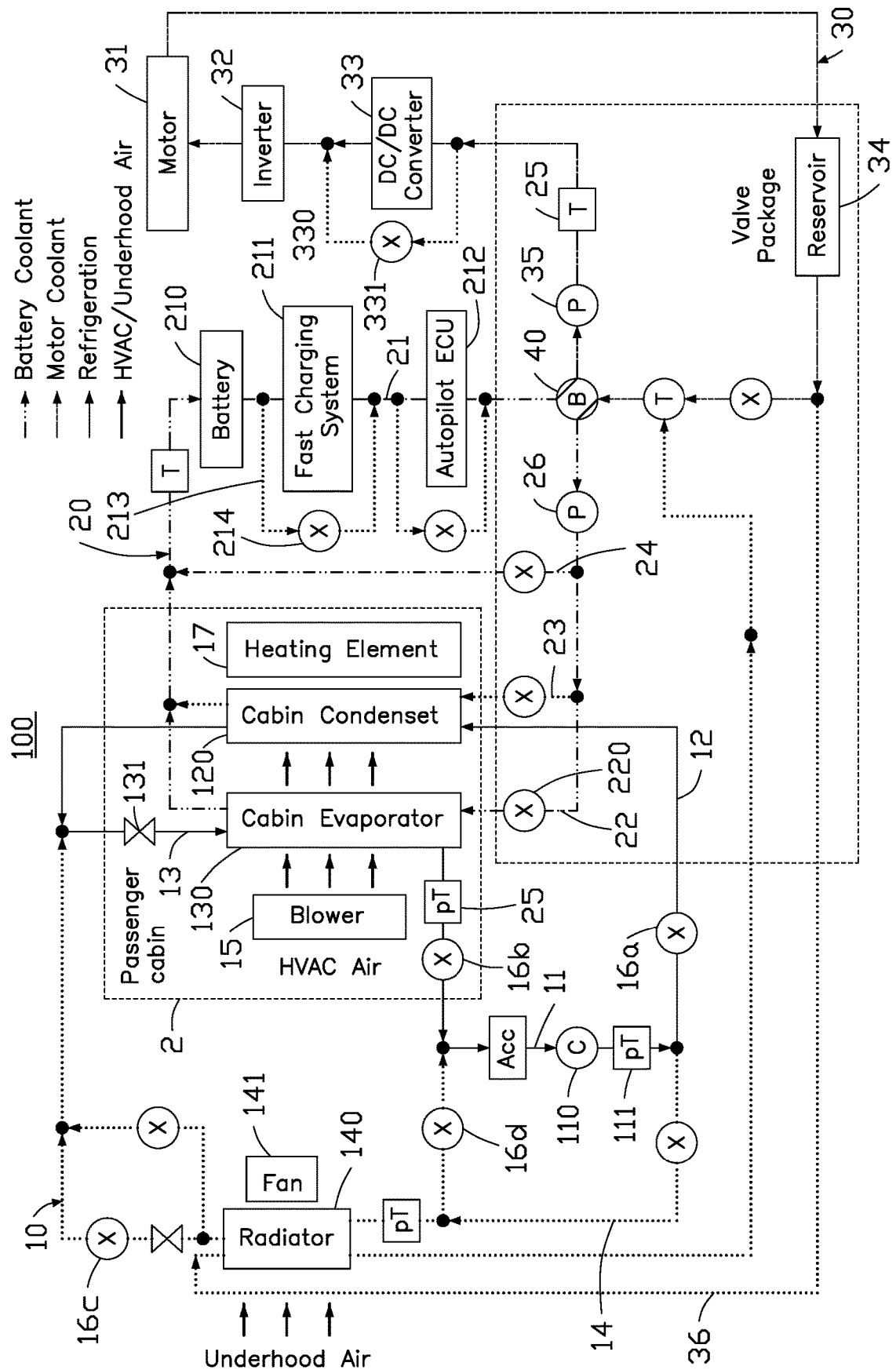
FIG. 5 is a diagrammatic view of the thermal management system of FIG. 1, operating in a fourth heating mode.
Figure 6:
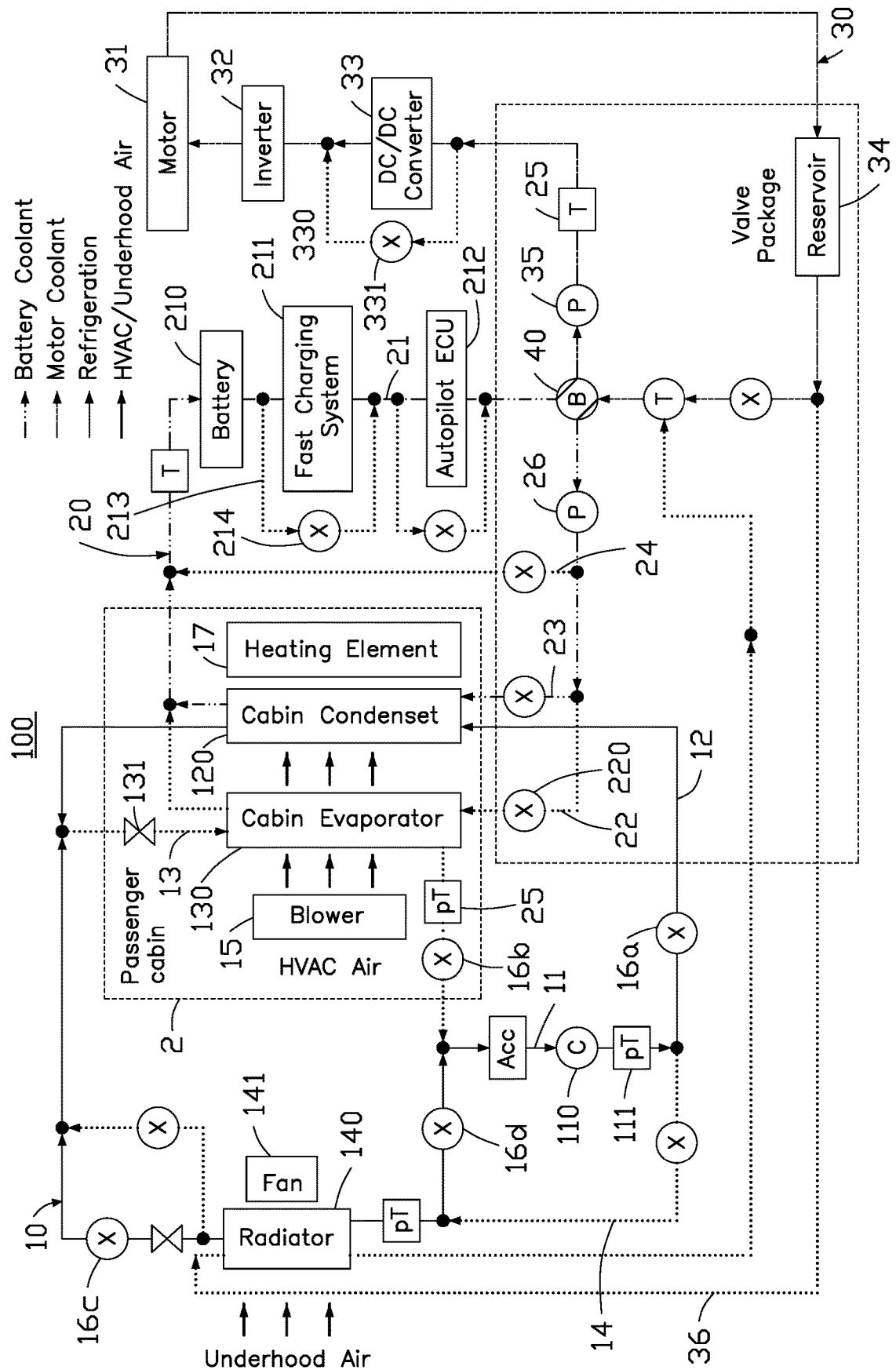
FIG. 6 is a diagrammatic view of the thermal management system of FIG. 1, operating in a fifth heating mode.

The thermal management system 100 can switch to the fourth heating mode at the ambient temperature lower than −10□. Referring to FIG. 5, different from the first heating mode, the first coolant branch 22 connects the cabin evaporator 130 of the refrigerant loop 10 to the coolant main-line 21, in addition, the third coolant branch 24 also connects to the coolant main-line 21. In this case, the coolant at the downstream end of the motor coolant loop 30 splits into two portions, one portion guiding to the first coolant branch 22 and the other portion guiding to the third coolant branch 24. Thus, a portion of the waste heat of the coolant can be absorbed by the cabin evaporator 130 and further be released to the passenger cabin 2 by the cabin condenser 120. The remaining portion of the waste heat of the coolant can be used to warm up the battery 210.

In at least one embodiment, the flow rates of the coolant in the first coolant branch 22 and the third coolant branch 24 are controlled by the second shut-off valves 220, so that the temperature of the passenger cabin 2 and the battery 210 is optimized.

Fifth Heating Mode

The thermal management system 100 can switch to the fifth heating mode at the ambient temperature higher than −10□ (for example, the ambient temperature is higher than −10□ and lower than 5□). Referring to FIG. 5, different from the second heating mode, the first coolant branch 22 does not communicate with the coolant main-line 21, but instead, the second coolant branch 23 connects the cabin condenser 120 of the refrigerant loop 10 to the coolant main-line 21. In this case, the cabin condenser 120 releases the heat from the radiator 140 to the passenger cabin 2. Since the coolant passes through the cabin condenser 120, the cabin condenser 120 also releases the heat from the radiator 140 to the coolant. Thus, both the passenger cabin 2 and the battery 210 are warmed up.

Since the refrigerant can also absorb the heat from the underhood air through the radiator 140, the COP is higher than 1.

Sixth Heating Mode

Figure 7:
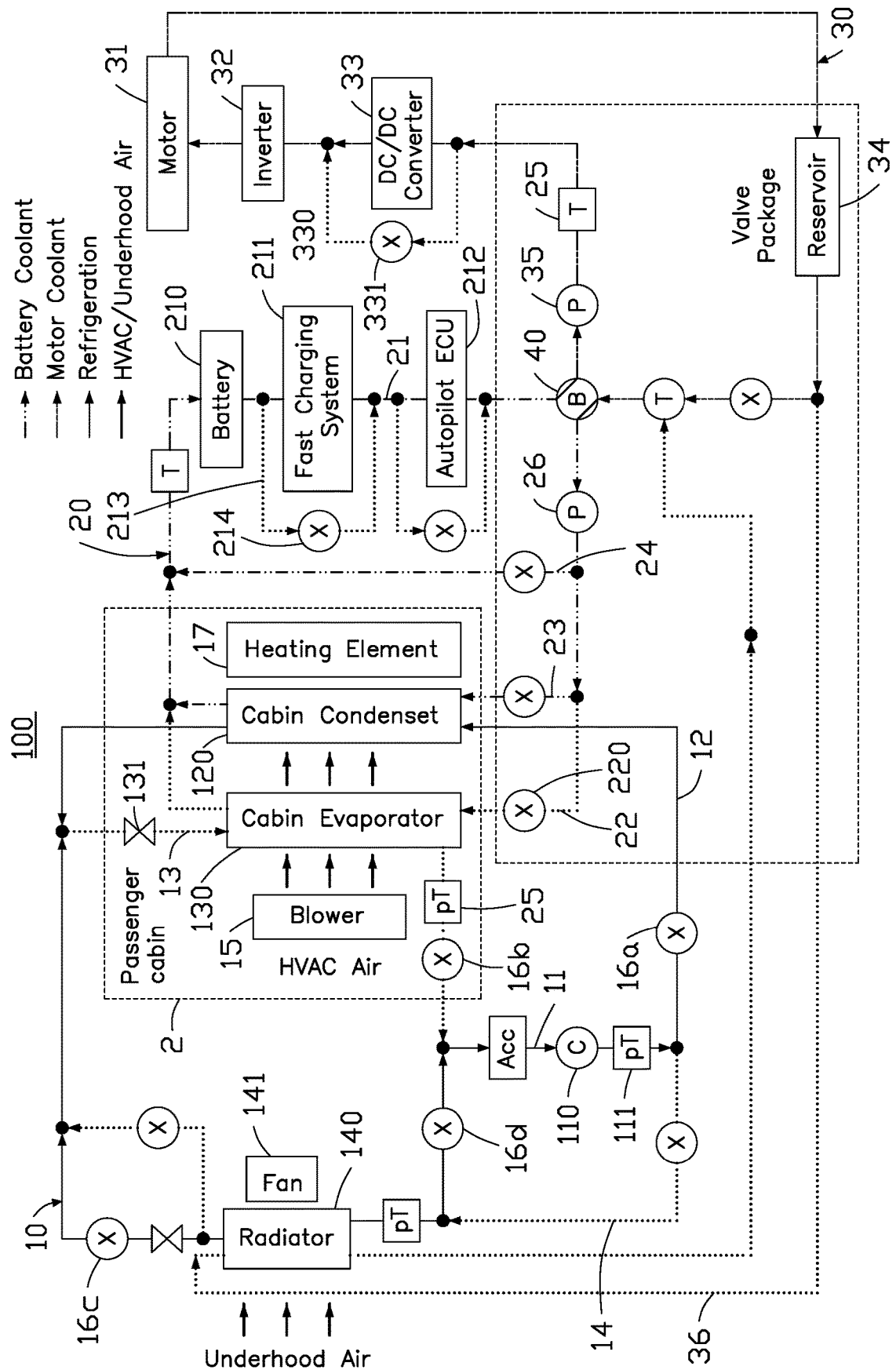
FIG. 7 is a diagrammatic view of the thermal management system of FIG. 1, operating in a sixth heating mode.

The thermal management system 100 can switch to the sixth heating mode at the ambient temperature higher than −10□ (for example, the ambient temperature is higher than −10□ and lower than 5□). Referring to FIG. 7, different from the fifth heating mode, the second coolant branch 23 connects the cabin condenser 120 of the refrigerant loop 10 to the coolant main-line 21. In addition, the third coolant branch 24 also connects to the coolant main-line 21.

In this case, the coolant at the downstream end of the motor coolant loop 30 splits into two portions, one portion guiding to the second coolant branch 23 and the other portion guiding to the third coolant branch 24. The cabin condenser 120 releases the heat from the radiator 140 to the passenger cabin 2, which can be used to warm up the passenger cabin 2. Since a portion of the coolant passes through the second coolant branch 23, the cabin condenser 120 also releases the heat from the radiator 140 to the coolant in the second coolant branch 23, which can be used to warm up the battery 210. The remaining portion of the coolant passes through the third coolant branch 24, so the waste heat thereof can also be used to warm up the battery 210. Thus, both the passenger cabin 2 and the battery 210 are warmed up.

Since the refrigerant can also absorb the heat from the underhood air through the radiator 140, the COP is higher than 1.

Seventh Heating Mode

Figure 8:
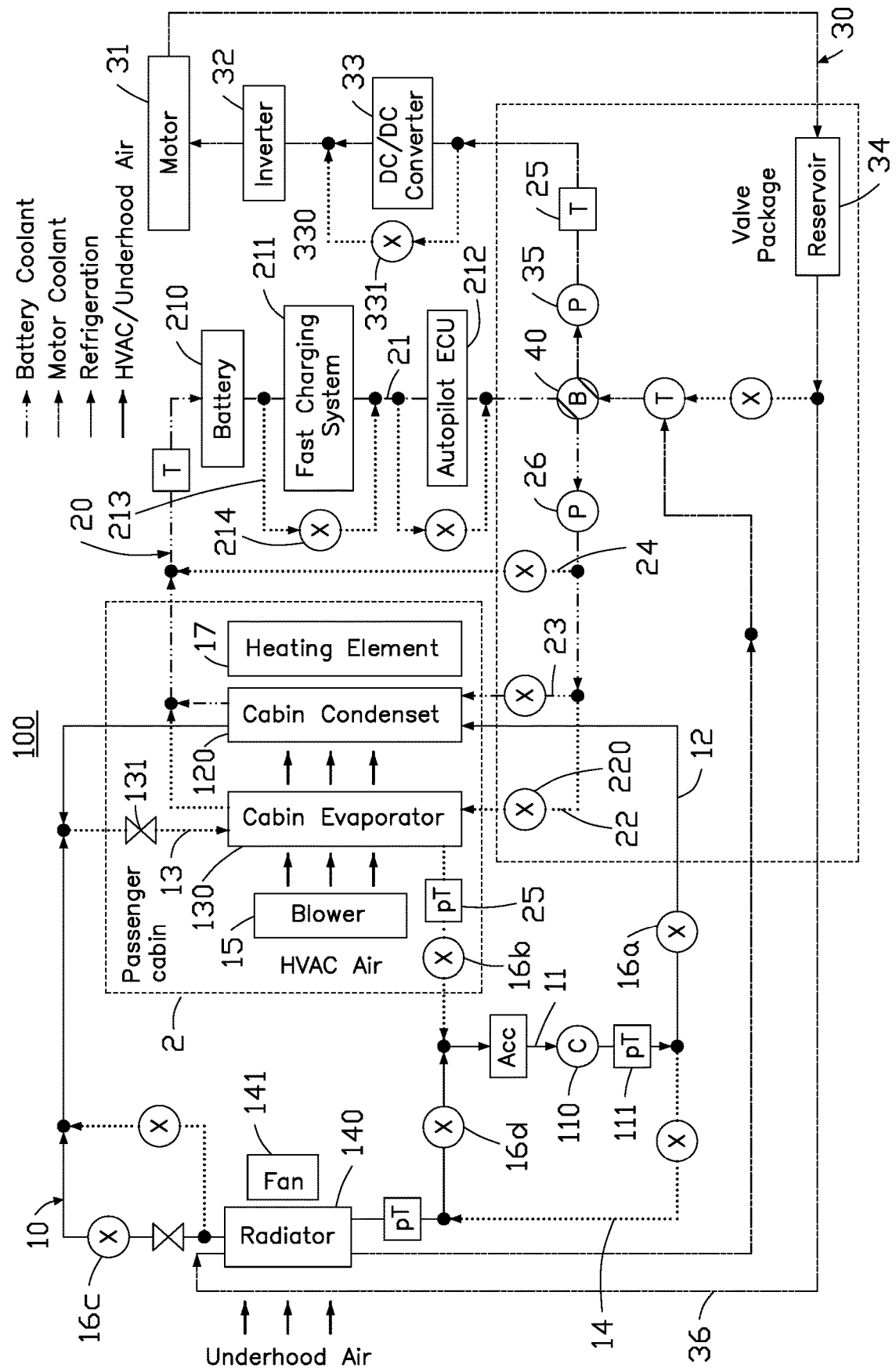
FIG. 8 is a diagrammatic view of the thermal management system of FIG. 1, operating in a seventh heating mode.

The thermal management system 100 can switch to the seventh heating mode at the ambient temperature lower than −10□ (for example, the ambient temperature is higher than −30□ and lower than −10□). Referring to FIG. 8, different from the fifth heating mode, each inlet of the four-way valve 40 is connected to one corresponding outlet to allow the coolant main-line 21 of the battery coolant loop 20 to connect to the motor coolant loop 30 in parallel. The cabin condenser 120 releases the heat from the radiator 140 to the passenger cabin 2 and to the battery 210.

Furthermore, the fourth coolant branch 36 fluidically connects the radiator 140 to the motor coolant loop 30. Thus, the waste heat in the motor coolant loop 30 is recycled to the radiator 140, which can be absorbed by the refrigerant passing through the radiator 140. Then, the waste heat in the motor coolant loop 30 can be released into the passenger cabin 2 by the cabin condenser 120 to warm up the passenger cabin 2, and also be used for defrosting the radiator 140.

Since the refrigerant can also absorb the heat from the underhood air and the motor coolant loop 30 through the radiator 140, the COP is higher than 1.

Eighth Heating Mode

Figure 9:
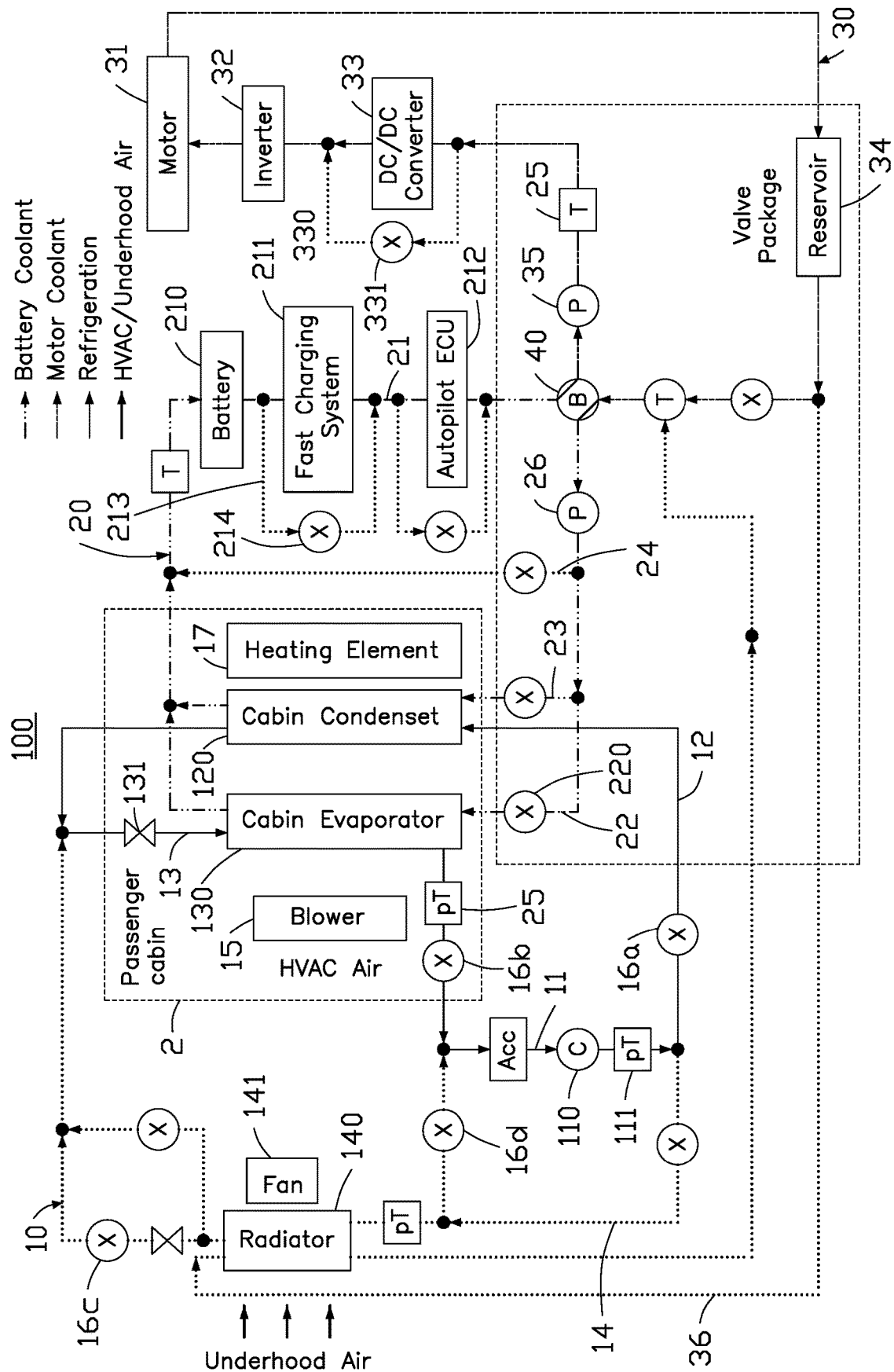
FIG. 9 is a diagrammatic view of the thermal management system of FIG. 1, operating in an eighth heating mode.

The thermal management system 100 can switch to the eighth heating mode at the ambient temperature lower than −10□. Referring to FIG. 9, different from the first heating mode, the first coolant branch 22 connects the cabin evaporator 130 of the refrigerant loop 10 to the coolant main-line 21, in addition, the second coolant branch 23 connects the cabin condenser 120 of the refrigerant loop 10 to the coolant main-line 21. The blower 15 stops working, so that the heat released by the refrigerant passing through the cabin condenser 120 cannot flow to the passenger cabin 2. In this case, the heat released by the refrigerant passing through the cabin condenser 120 does not used to warm up the passenger cabin 2, but in instead be absorbed by the coolant flowing in the second coolant branch 23 to warm up the battery 210. In addition, since the first coolant branch 22 connects the cabin evaporator 130 to the coolant main-line 21, a complete cycling loop for the refrigerant is formed. The refrigerant flowing in the first coolant branch 22 can also absorb the waste heat from the coolant flowing in the first coolant branch 22. The heat absorbed by the coolant flowing in the second coolant branch 23 is greater than the waste heat released to the coolant flowing in the first coolant branch 22, and the difference therebetween is equal to the power of the compressor 110.

In at least one embodiment, the motor 31 and the inverter 32 work in a lower efficiency, so a large portion of the electric energy output by the battery 210 is converted to the heat to preheat the battery 210.

Nineth Heating Mode

Figure 10:
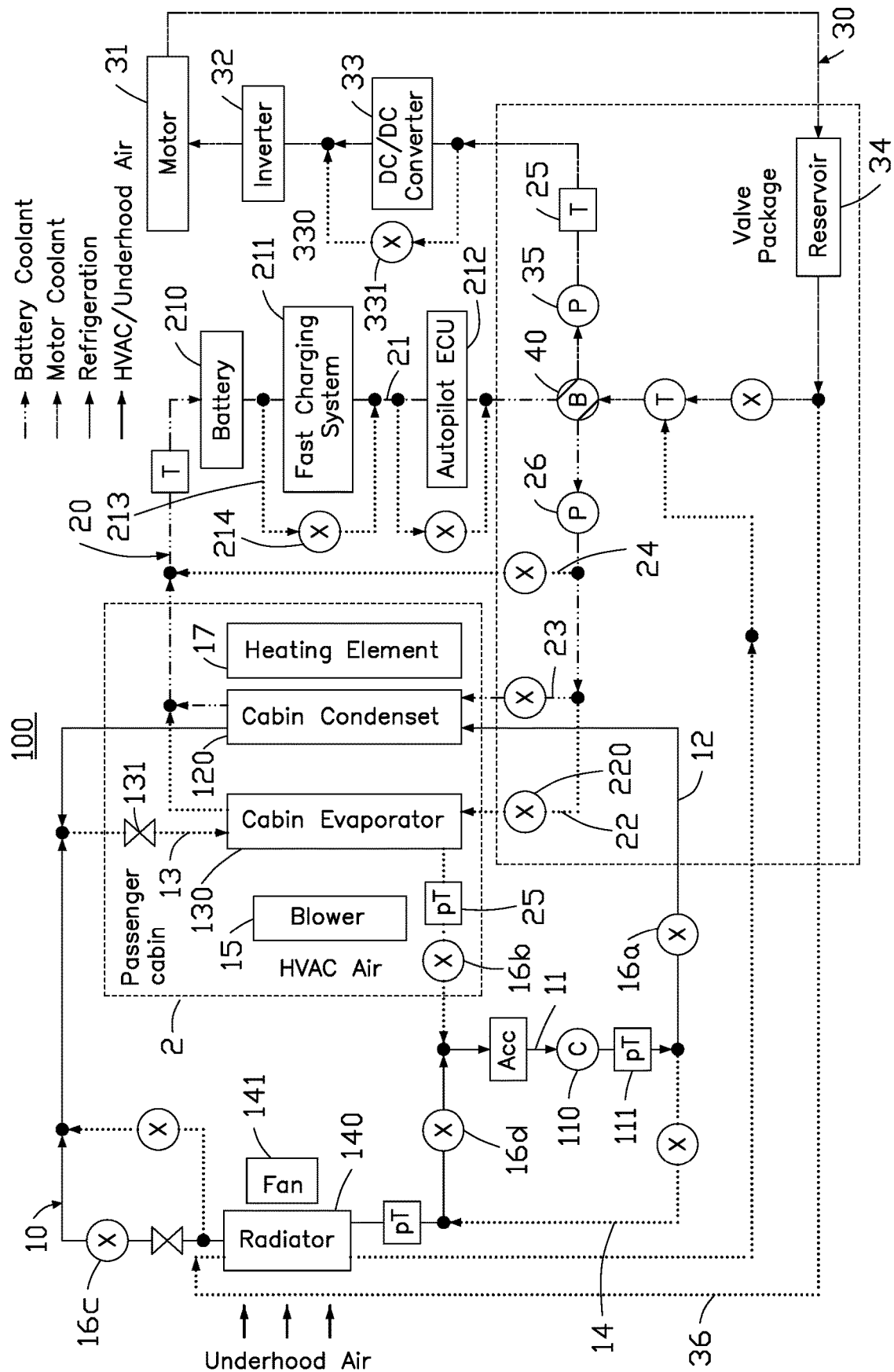
FIG. 10 is a diagrammatic view of the thermal management system of FIG. 1, operating in a ninth heating mode.

The thermal management system 100 can switch to the ninth heating mode at the ambient temperature lower than 5□. Referring to FIG. 10, different from the fifth heating mode, the blower 15 stops working, so that the heat released by the refrigerant passing through the cabin condenser 120 flows to the passenger cabin 2. In this case, the heat released by the refrigerant passing through the cabin condenser 120 does not used to warm up the passenger cabin 2, but in instead be absorbed by the coolant flowing in the second coolant branch 23 to warm up the battery 210.

In at least one embodiment, the motor 31 and the inverter 32 work in a lower efficiency, so a large portion of the electric energy output by the battery 210 is converted to the heat to preheat the battery 210.

Tenth Heating Mode

Figure 11:
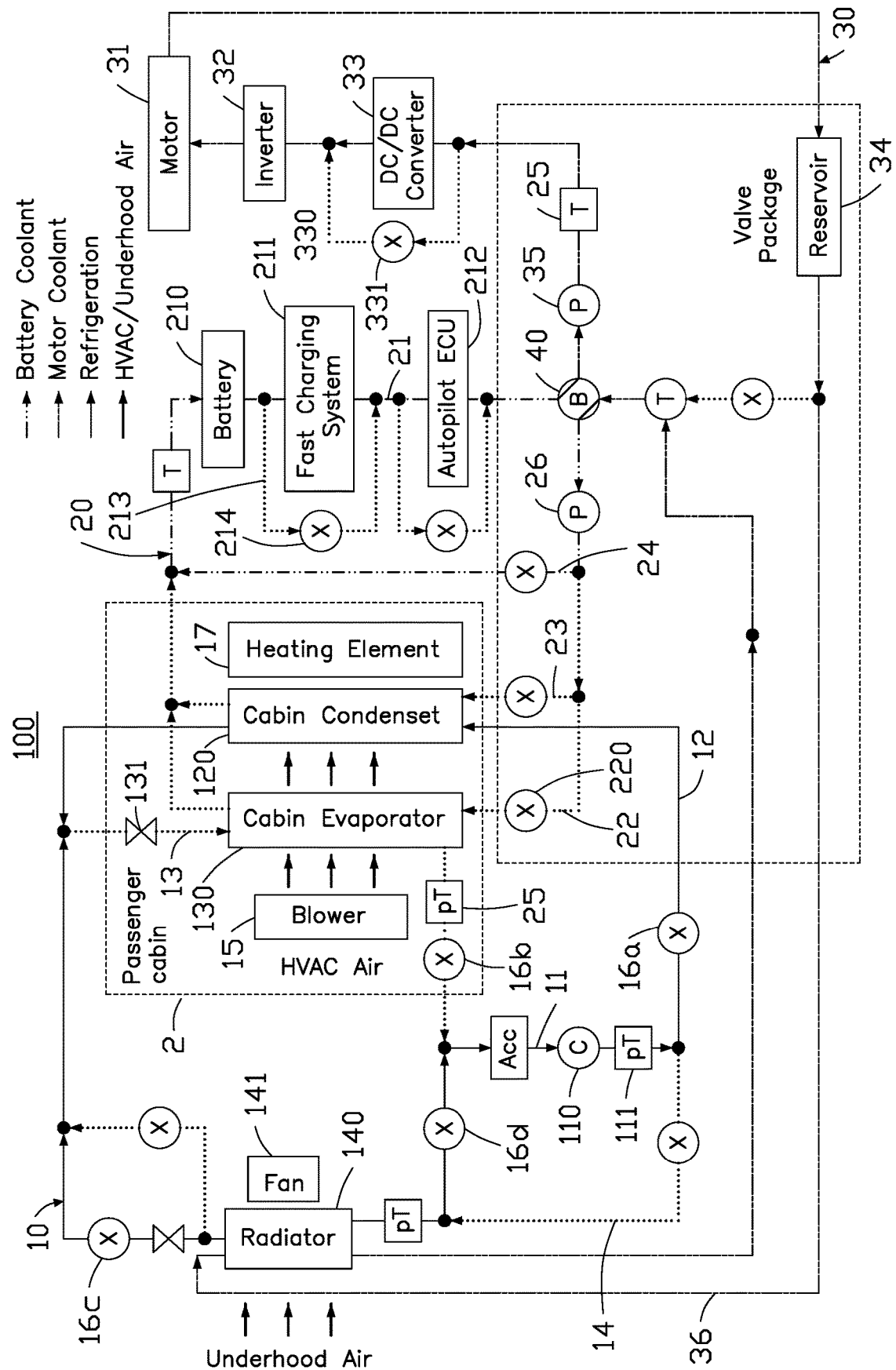
FIG. 11 is a diagrammatic view of the thermal management system of FIG. 1, operating in a tenth heating mode.

The thermal management system 100 can switch to the tenth heating mode when the electric vehicle 1 is driving at the ambient temperature higher than −20□ and lower than 20□. Referring to FIG. 11, different from the second heating mode, the fourth coolant branch 36 fluidically connects the radiator 140 to the motor coolant loop 30. Thus, the waste heat in the motor coolant loop 30 and the battery coolant loop 20 is recycled to the radiator 140, which can be absorbed by the refrigerant passing through the radiator 140. Then, the waste heat in the motor coolant loop 30 and the battery coolant loop 20 can be released into the passenger cabin 2 by the cabin condenser 120 to warm up the passenger cabin 2, and also be used for defrosting the radiator 140.

Since the refrigerant can also absorb the heat from the underhood air and from the coolant in the motor coolant loop 30 through the radiator 140, the COP is higher than 1.

Eleventh Heating Mode

Figure 12:
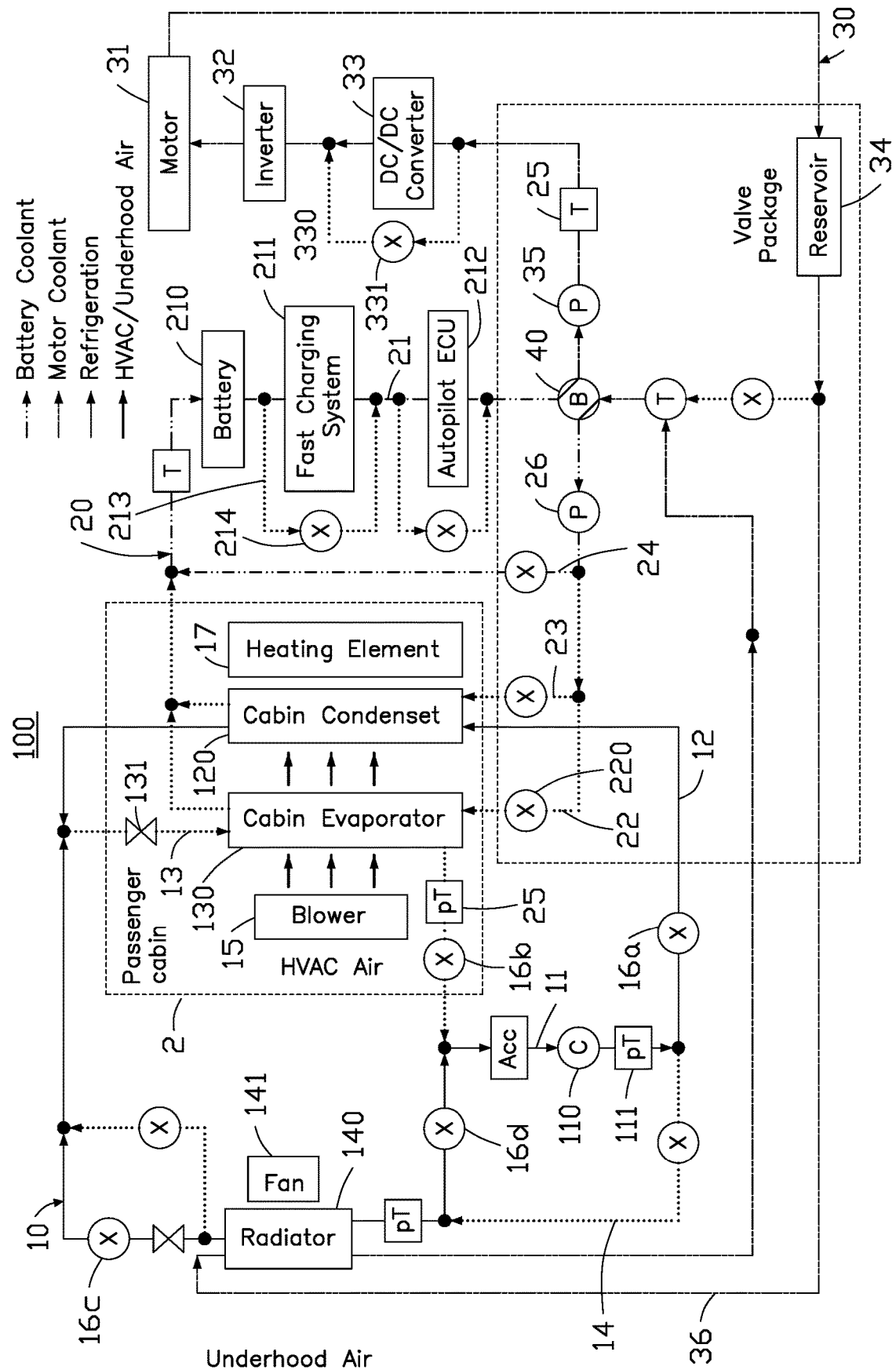
FIG. 12 is a diagrammatic view of the thermal management system of FIG. 1, operating in an eleventh heating mode.

The thermal management system 100 can switch to the eleventh heating mode when the electric vehicle 1 is driving at the ambient temperature higher than −30□ and lower than 20□. Referring to FIG. 12, different from the tenth heating mode, no air passes through the radiator 140. That is, the refrigerant receives no heat from the underhood air through the radiator 140. In this case, after passing through the cabin condenser 120, the refrigerant releases heat to the passenger cabin 2. In addition, the waste heat in the motor coolant loop 30 and the battery coolant loop 20 can be released into the passenger cabin 2 by the cabin condenser 120 to warm up the passenger cabin 2.

Twelfth Heating Mode

Figure 13:
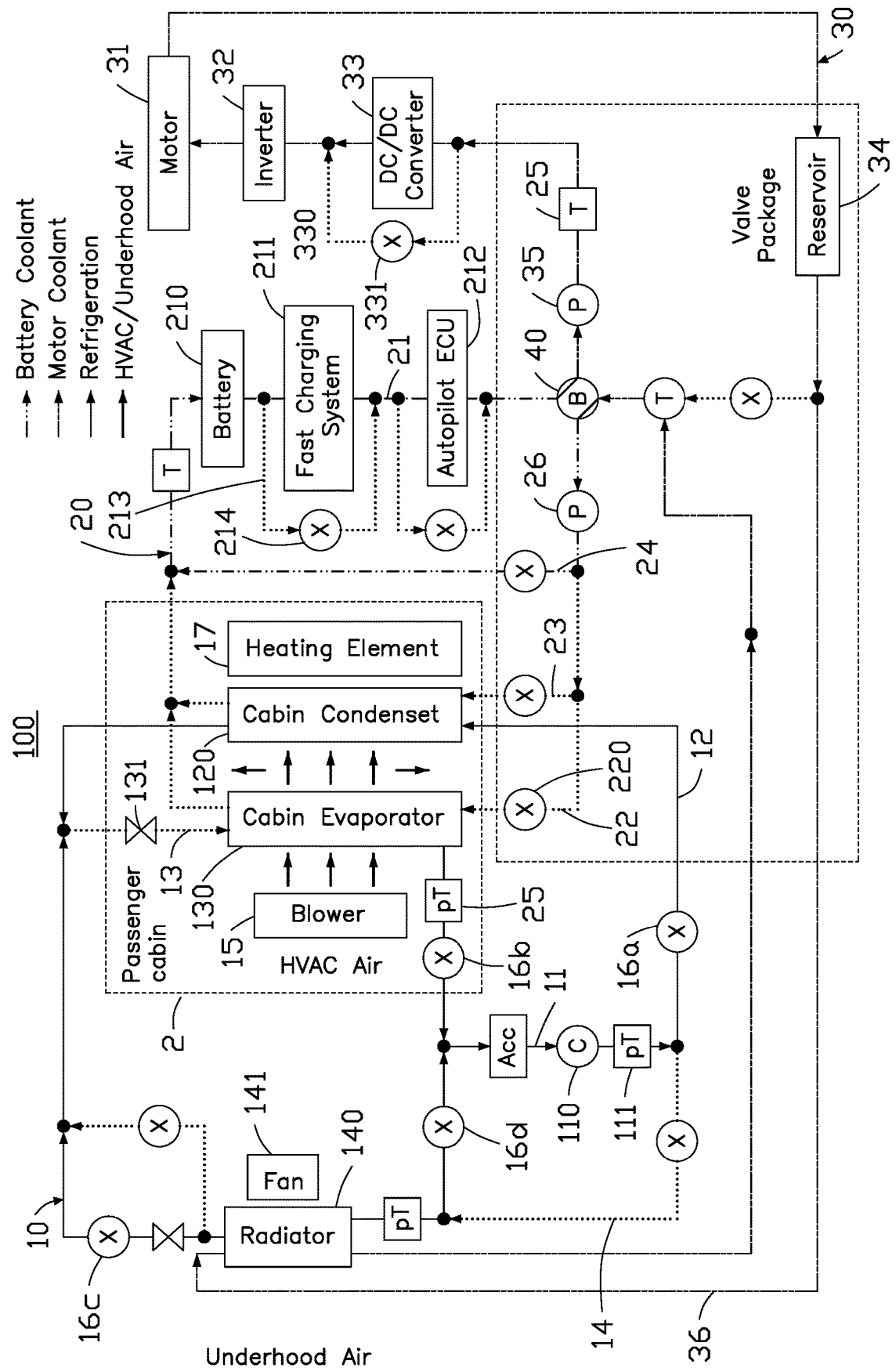
FIG. 13 is a diagrammatic view of the thermal management system of FIG. 1, operating in a twelfth heating mode.

The thermal management system 100 can switch to the twelfth heating mode when the electric vehicle 1 is driving at the ambient temperature higher than −10□ and lower than 20□. Referring to FIG. 13, different from the eleventh heating mode, at least one opening is defined surrounding the cabin evaporator 130 to expel the cool air out of the passenger cabin 2.

Thirteenth Heating Mode

Figure 14:
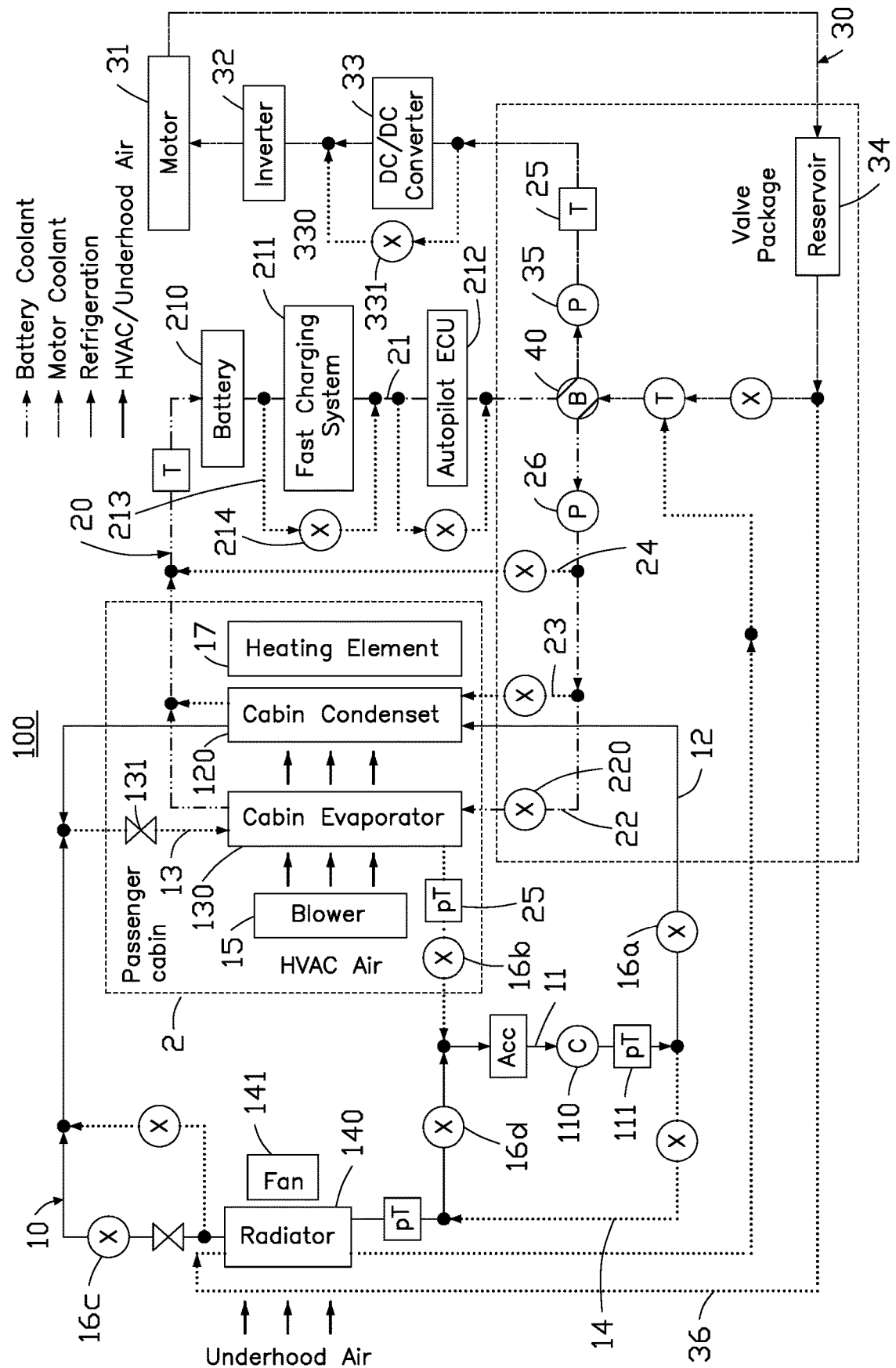
FIG. 14 is a diagrammatic view of the thermal management system of FIG. 1, operating in a thirteenth heating mode.
Figure 15:
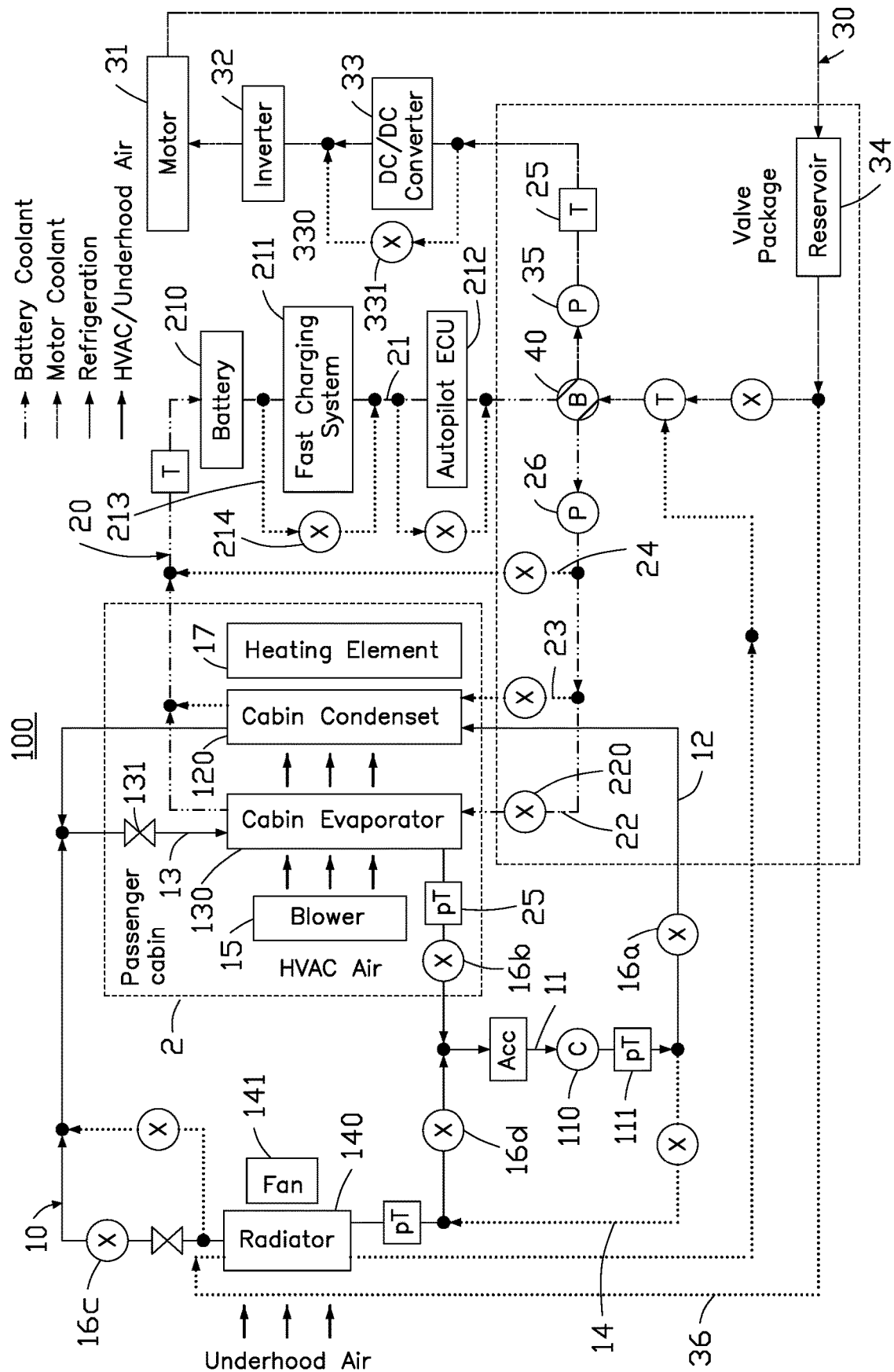
FIG. 15 is a diagrammatic view of the thermal management system of FIG. 1, operating in a fourteenth heating mode.

The thermal management system 100 can switch to the thirteenth heating mode at the ambient temperature higher than −10□ and lower than 20□. Referring to FIG. 14, different from the second heating mode, the second shut-off valves 220 are operated to cause the first coolant branch 22 to connect the cabin evaporator 130 of the refrigerant loop 10 to the coolant main-line 21. Since the refrigerant does not flow through the cabin evaporator 130, the waste heat from the battery coolant loop 20 and the motor coolant loop 30 is recycled through the cabin evaporator 130, which can be absorb by the air passing through the cabin evaporator 130.

Fourteenth Heating Mode

The thermal management system 100 can switch to the fourteenth heating mode at the ambient temperature higher than −10□ and lower than 20□. Referring to FIG. 14, different from the thirteenth heating mode, the first refrigerant branch 13 also communicates with the first refrigerant main-line 11 and the second refrigerant main-line 12, so that the refrigerant can also successively circulate in the first refrigerant main-line 11, the second refrigerant main-line 12, and the first refrigerant branch 13. Thus, the refrigerant also flows through the cabin evaporator 130, which can absorb the waste heat from the coolant, and then release the waste heat to the passenger cabin 2 by the cabin condenser 120.

Fifteenth Heating Mode

Figure 16:
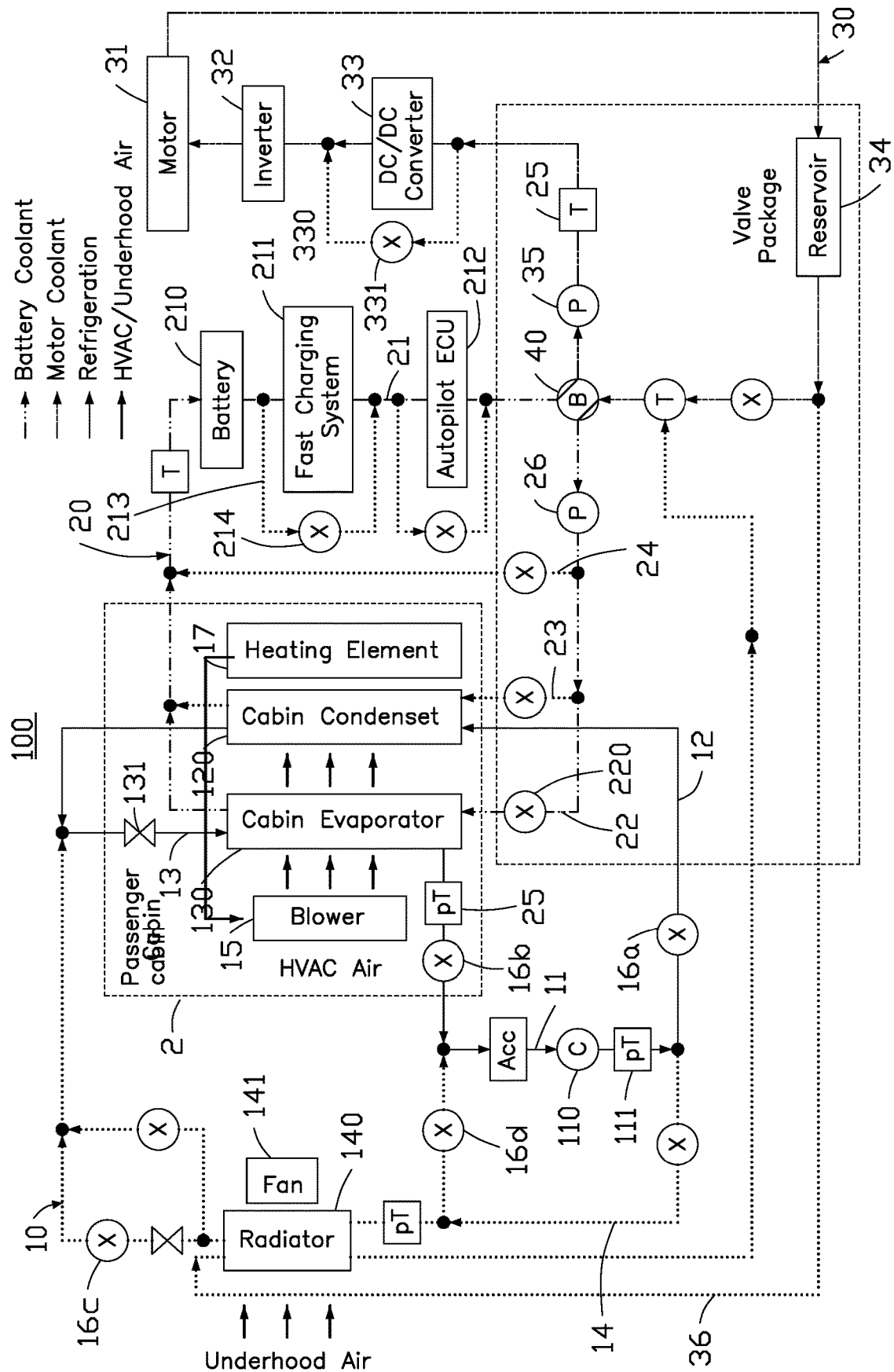
FIG. 16 is a diagrammatic view of the thermal management system of FIG. 1, operating in a fifteenth heating mode.

The thermal management system 100 can switch to the fifteenth heating mode at the ambient temperature lower than −10□. Referring to FIG. 16, different from the first heating mode, an airflow path is formed between the cabin evaporator 130 and the cabin condenser 120, which can improve the heat transfer efficiency.

The thermal management system 100 can also operate in a plurality of cooling modes when the ambient temperature is high, thereby providing cool air to the passenger cabin 2. In at least one embodiment, five cooling modes are included. The working principles of the respective cooling modes will be described as follows.

First Cooling Mode

Figure 17:
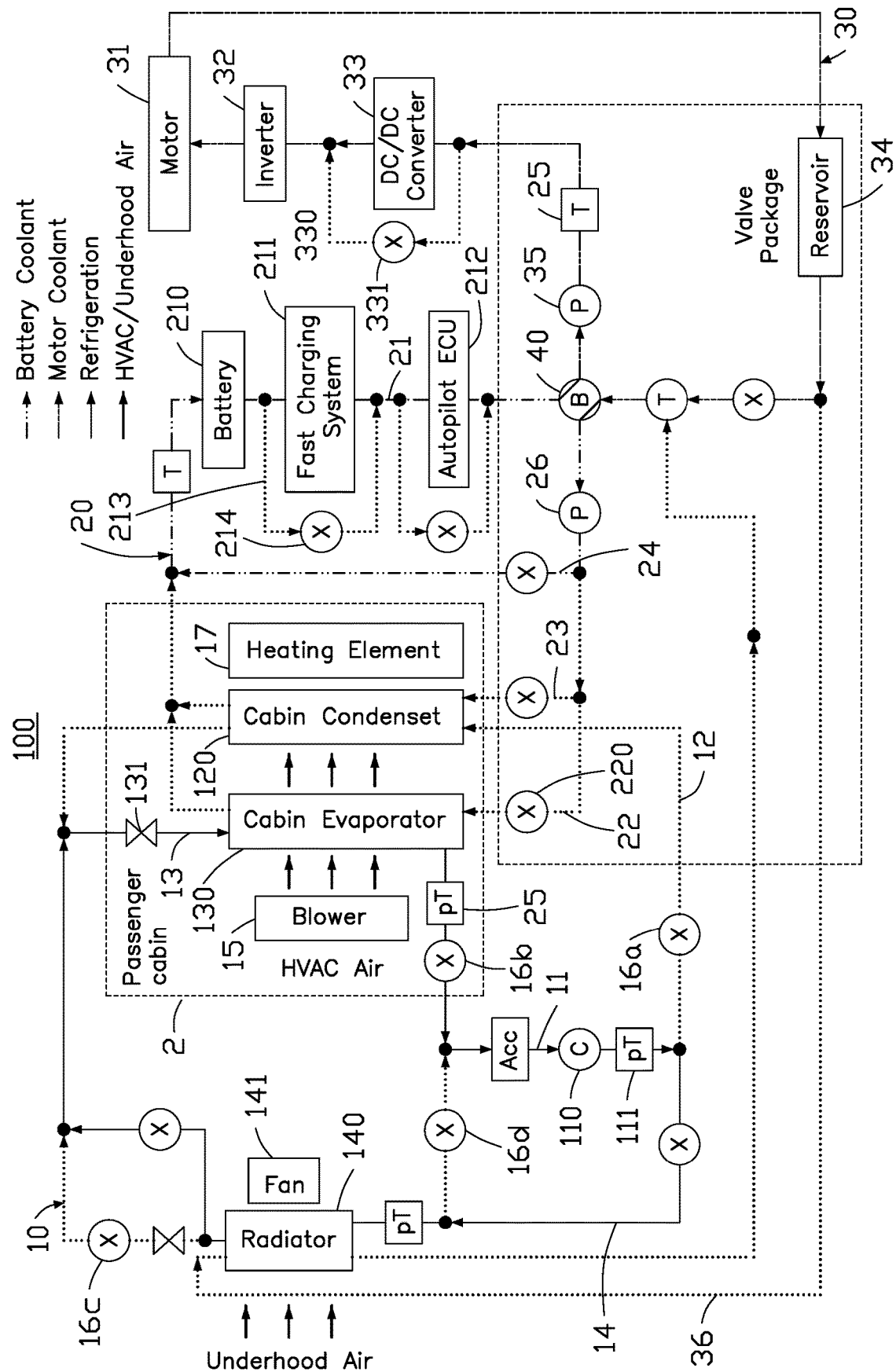
FIG. 17 is a diagrammatic view of the thermal management system of FIG. 1, operating in a first cooling mode.

The thermal management system 100 can switch to the first cooling mode at the ambient temperature higher than 20□ and lower than 50□. Referring to FIG. 17, the first shut-off valves 16a, 16b, 16c and 16d are operated to cause the first refrigerant main-line 11, the second refrigerant branch 14, and the first refrigerant branch 13 to communicate, so that the refrigerant can successively circulate in the first refrigerant main-line 11, the second refrigerant branch 14, and the first refrigerant branch 13. The compressor 110 compresses a vapor of the refrigerant with low temperature and low pressure contained within the refrigerant loop 10 into a vapor with high temperature and high pressure. After passing through the radiator 140, the radiator 140 functions as a condenser that causes the refrigerant to change phase from vapor to liquid and release heat to the underhood air. The refrigerant further changes phase from liquid to vapor after passing through the cabin evaporator 130, and absorbs heat from the passenger cabin 2. The blower 15 blows cool air across the passenger cabin 2. Thus, the passenger cabin 2 is cooled. The vapor is then circulated back into the compressor 110.

Furthermore, each inlet of the four-way valve 40 is connected to one corresponding outlet to allow the coolant main-line 21 of the battery coolant loop 20 to connect to the motor coolant loop 30 in series. The second shut-off valves 220 are operated to cause the third coolant branch 24 to connect to the coolant main-line 21. Thus, the coolant can circulate in the coolant main-line 21, the motor coolant loop 30, and the third coolant branch 24. The coolant does not exchange heat with the refrigerant passing through the cabin evaporator 130.

Second Cooling Mode

Figure 18:
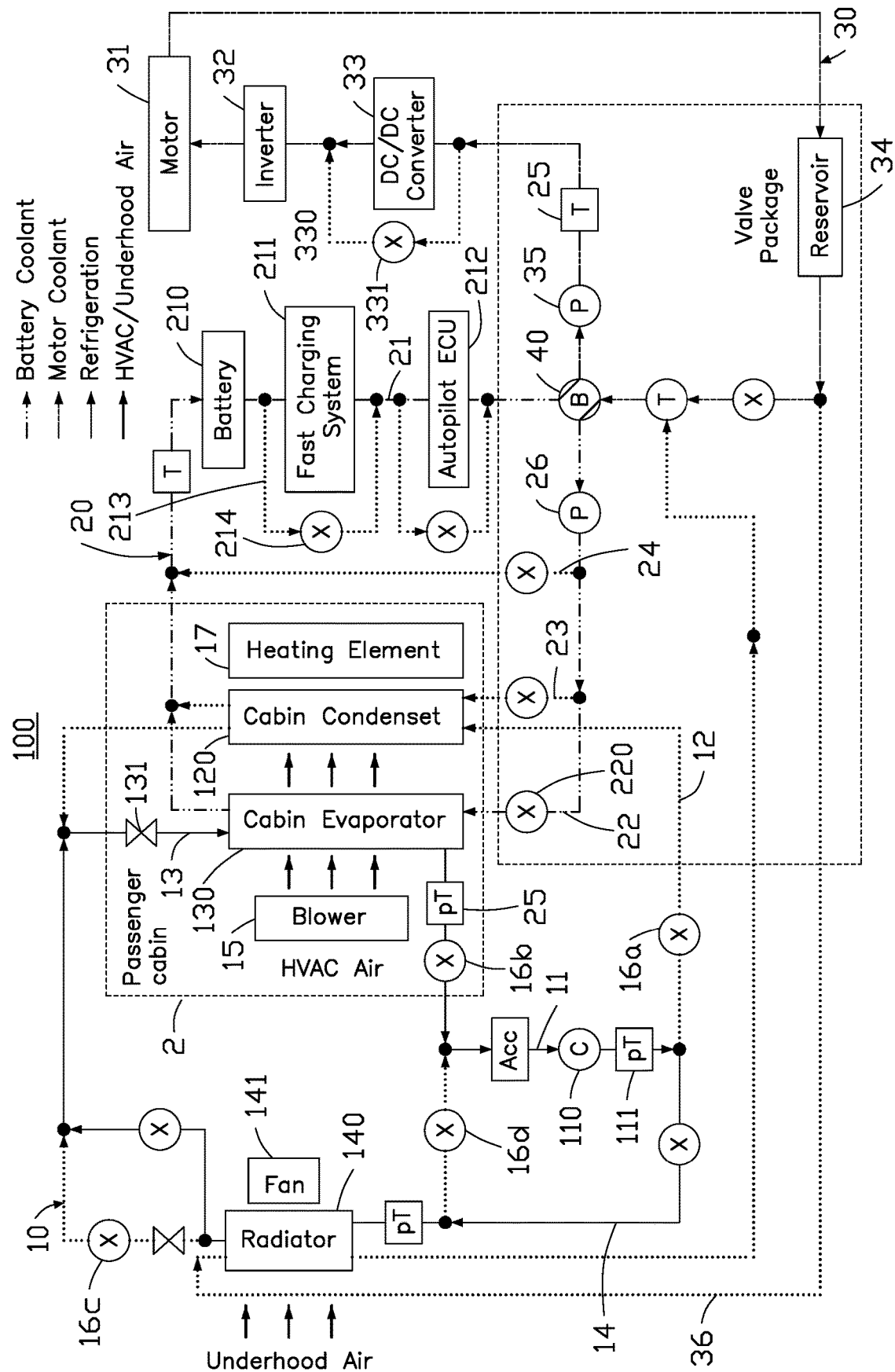
FIG. 18 is a diagrammatic view of the thermal management system of FIG. 1, operating in a second cooling mode.

The thermal management system 100 can switch to the second cooling mode at the ambient temperature higher than 20□ and lower than 50□. Referring to FIG. 18, different from the first cooling mode, instead of the third coolant branch 24 connecting to the coolant main-line 21, the first coolant branch 22 connects the cabin evaporator 130 of the refrigerant loop 10 to the coolant main-line 21. In this case, the coolant also flows through the cabin evaporator 130. The waste heat of the coolant is absorbed by the refrigerant flowing through the cabin evaporator 130, thus the coolant is also cooled by the refrigerant passing through the cabin evaporator 130. That is, the passenger cabin 2, the battery 210, and the motor 31 are cooled.

Third Cooling Mode

Figure 19:
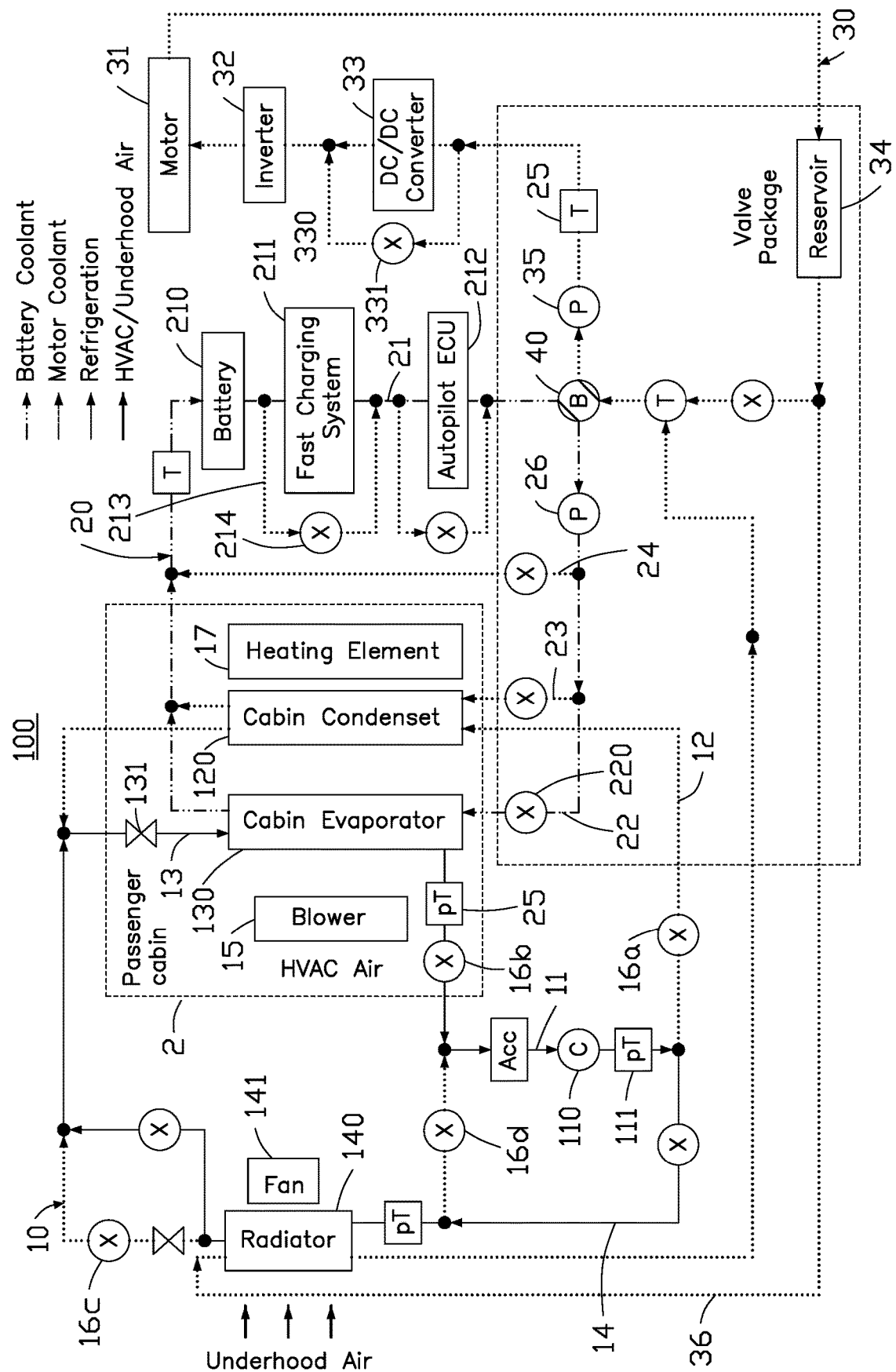
FIG. 19 is a diagrammatic view of the thermal management system of FIG. 1, operating in a third cooling mode.

The thermal management system 100 can switch to the third cooling mode during a charging of the battery 210, at the ambient temperature higher than 10□ and lower than 50□. Referring to FIG. 19, different from the second cooling mode, the blower 15 stops working, so that no cool air flows through the passenger cabin 2. Also, each inlet of the four-way valve 40 is connected to one corresponding outlet to allow the coolant main-line 21 of the battery coolant loop 20 to connect to the motor coolant loop 30 in parallel. In this case, the cabin evaporator 130 can absorb heat from the coolant flowing in first coolant branch 22 to cool the battery 210.

In this case, the powertrain system is not in need of cooling, so the coolant stops circulating in the motor coolant loop 30.

Fourth Cooling Mode

Figure 20:
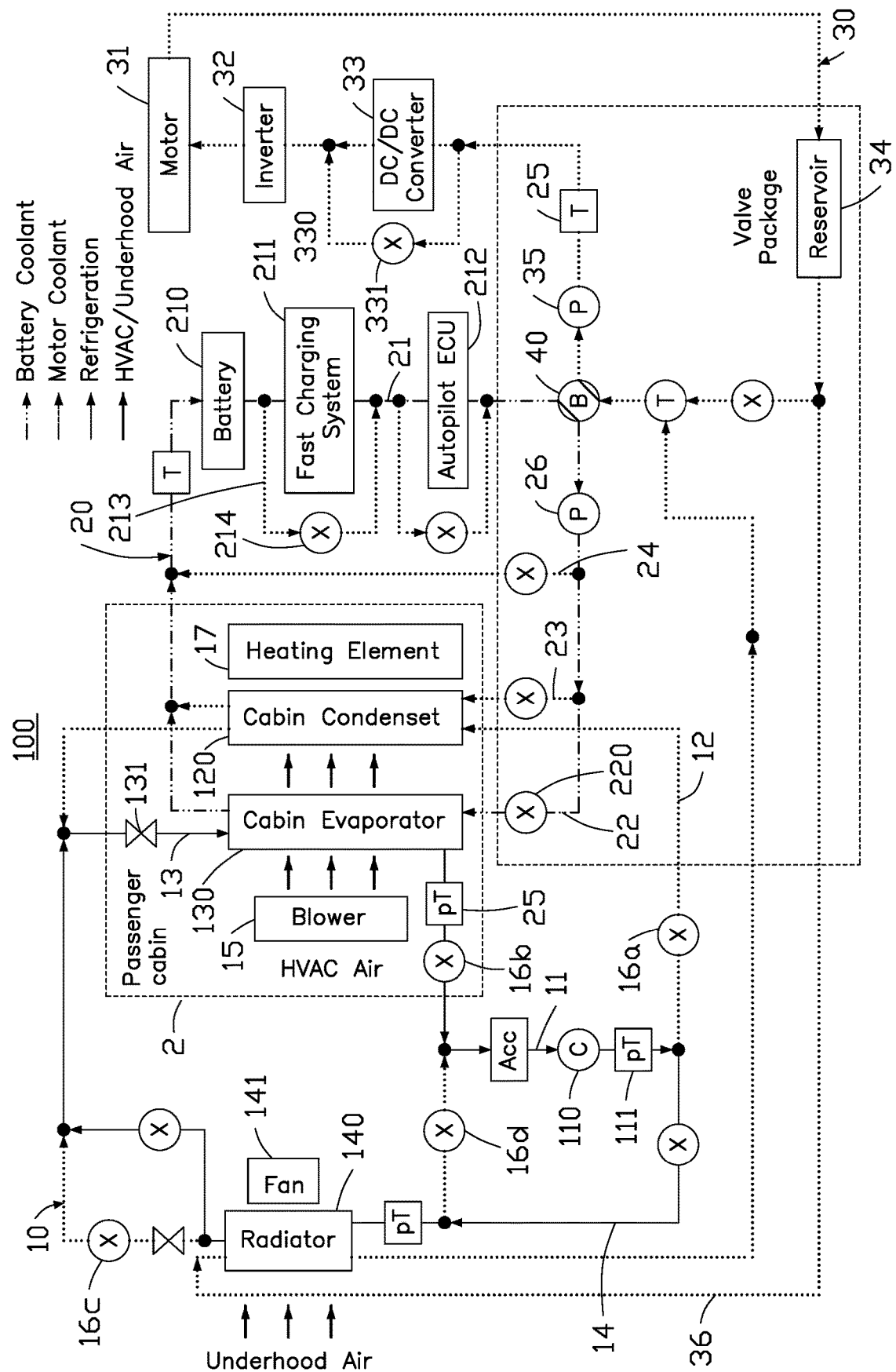
FIG. 20 is a diagrammatic view of the thermal management system of FIG. 1, operating in a fourth cooling mode.

The thermal management system 100 can switch to the fourth cooling mode when the user stays in the passenger cabin 2 and waits for the charging of the battery 2100, at the ambient temperature higher than 20□ and lower than 50□. Referring to FIG. 20, different from the third cooling mode, the blower 15 blows the cool air through the passenger cabin 2. In this case, both the passenger cabin 2 and the battery 210 are cooled.

Fifth Cooling Mode

Figure 21:
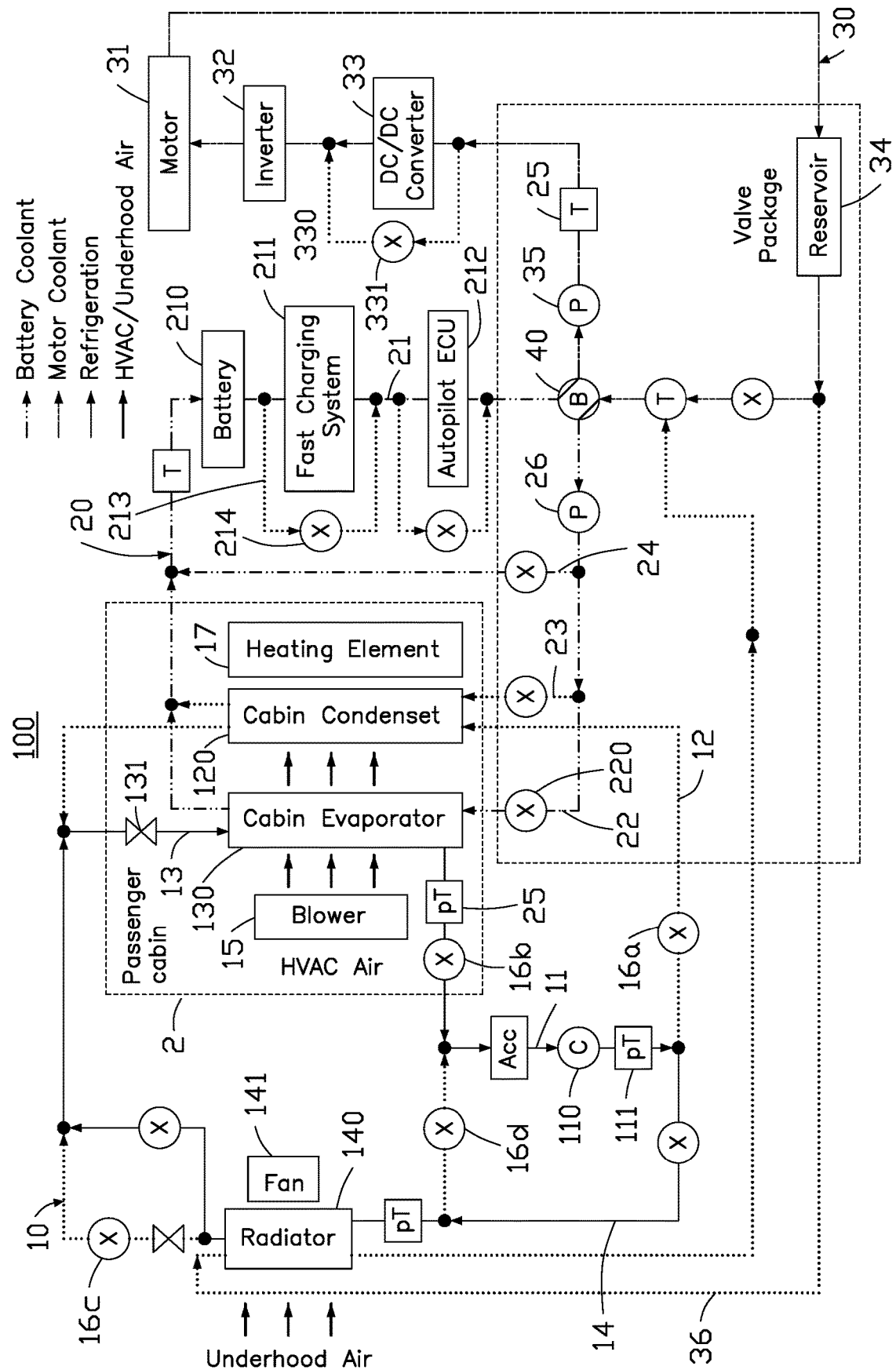
FIG. 21 is a diagrammatic view of the thermal management system of FIG. 1, operating in a fifth cooling mode.

The thermal management system 100 can switch to the fifth cooling mode at the ambient temperature higher than 20□ and lower than 30□. Referring to FIG. 21, different from the first cooling mode, the third coolant branch 24 connects to the coolant main-line 21, in addition, the first coolant branch 22 connects the cabin evaporator 130 of the refrigerant loop 10 to the coolant main-line 21. In this case, the coolant at the downstream end of the motor coolant loop 30 splits into two portions, one portion guiding to the first coolant branch 22 and the other portion guiding to the third coolant branch 24. Thus, the waste heat of the portion of the coolant passing through first coolant branch 22 can be absorbed by the refrigerant passing through the cabin evaporator 130. The remaining coolant passing through the third coolant branch 24 does not exchange heat with the refrigerant.

In at least one embodiment, the flow rates of the coolant in the first coolant branch 22 and the third coolant branch 24 are controlled by the second shut-off valves 220, so that the temperature of the passenger cabin 2 and the battery 210 is optimized.

Besides the heating modes and the cooling modes, the thermal management system 100 can operate in a plurality of supplement modes. For example, the supplement modes include a battery temperature uniformization mode, a battery energy conservation mode, a dehumidification mode, and a winter time fast charging mode. The working principles of the respective supplement modes will be described as follows.

Battery Temperature Uniformization Mode

Figure 22:
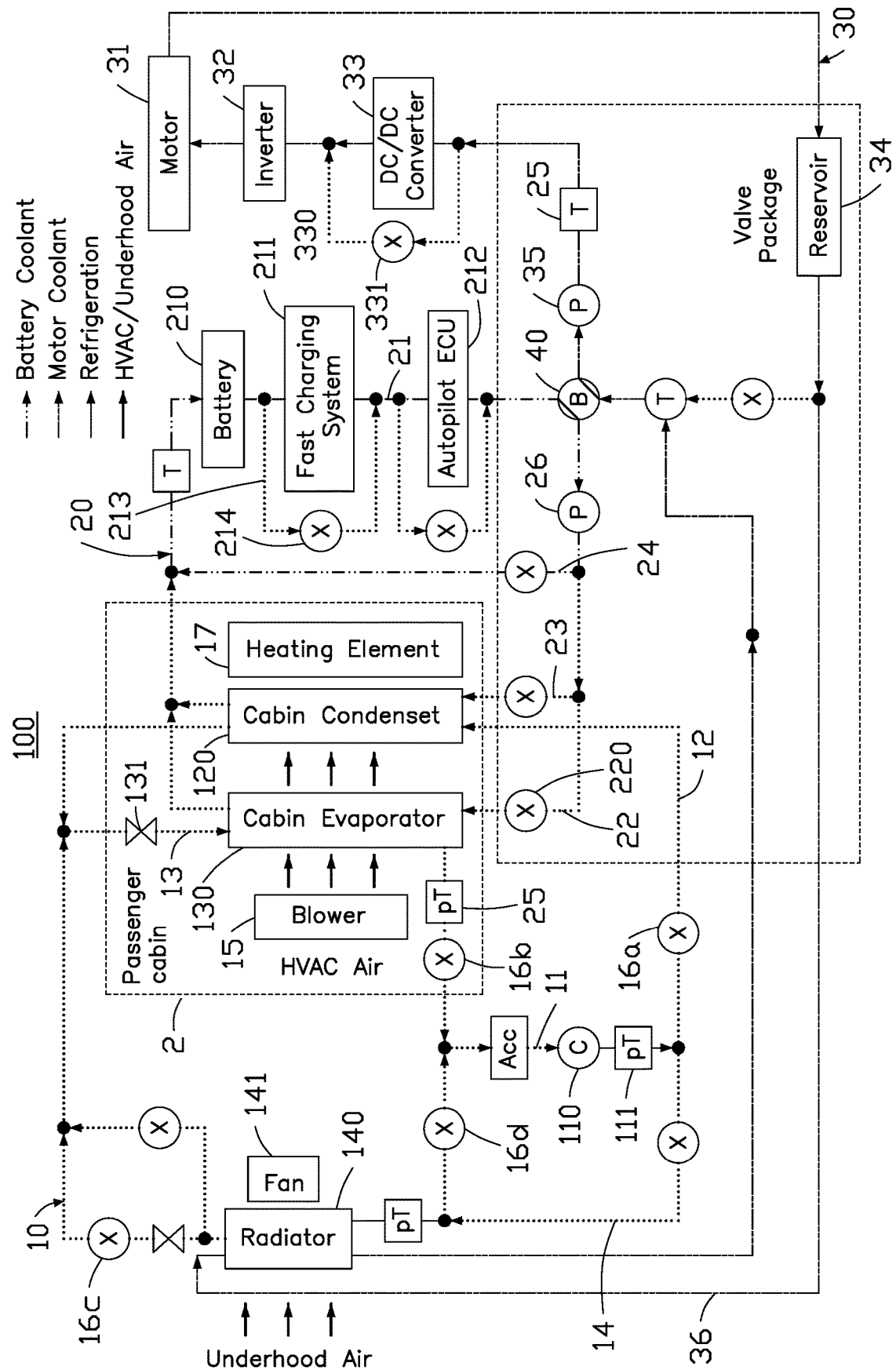
FIG. 22 is a diagrammatic view of the thermal management system of FIG. 1, operating in a battery temperature uniformization mode.

The thermal management system 100 can switch to the battery temperature uniformization mode at the ambient temperature higher than 5□ and lower than 30□. Referring to FIG. 22, the refrigerant does not circulate in the refrigerant loop 10. Each inlet of the four-way valve 40 is connected to one corresponding outlet to allow the coolant main-line 21 of the battery coolant loop 20 to connect to the motor coolant loop 30 in parallel. The third coolant branch 24 connects to the coolant main-line 21. Thus, the coolant successively circulates in the coolant main-line 21 and the third coolant branch 24, and the temperature of the battery 210 is uniformized.

Furthermore, the fourth coolant branch 36 fluidically connects the radiator 140 to the motor coolant loop 30. Thus, the waste heat in the motor coolant loop 30 is recycled to the radiator 140, which can be absorbed by the refrigerant passing through the radiator 140 and further released to the underhood air.

Battery Energy Conservation Mode

Figure 23:
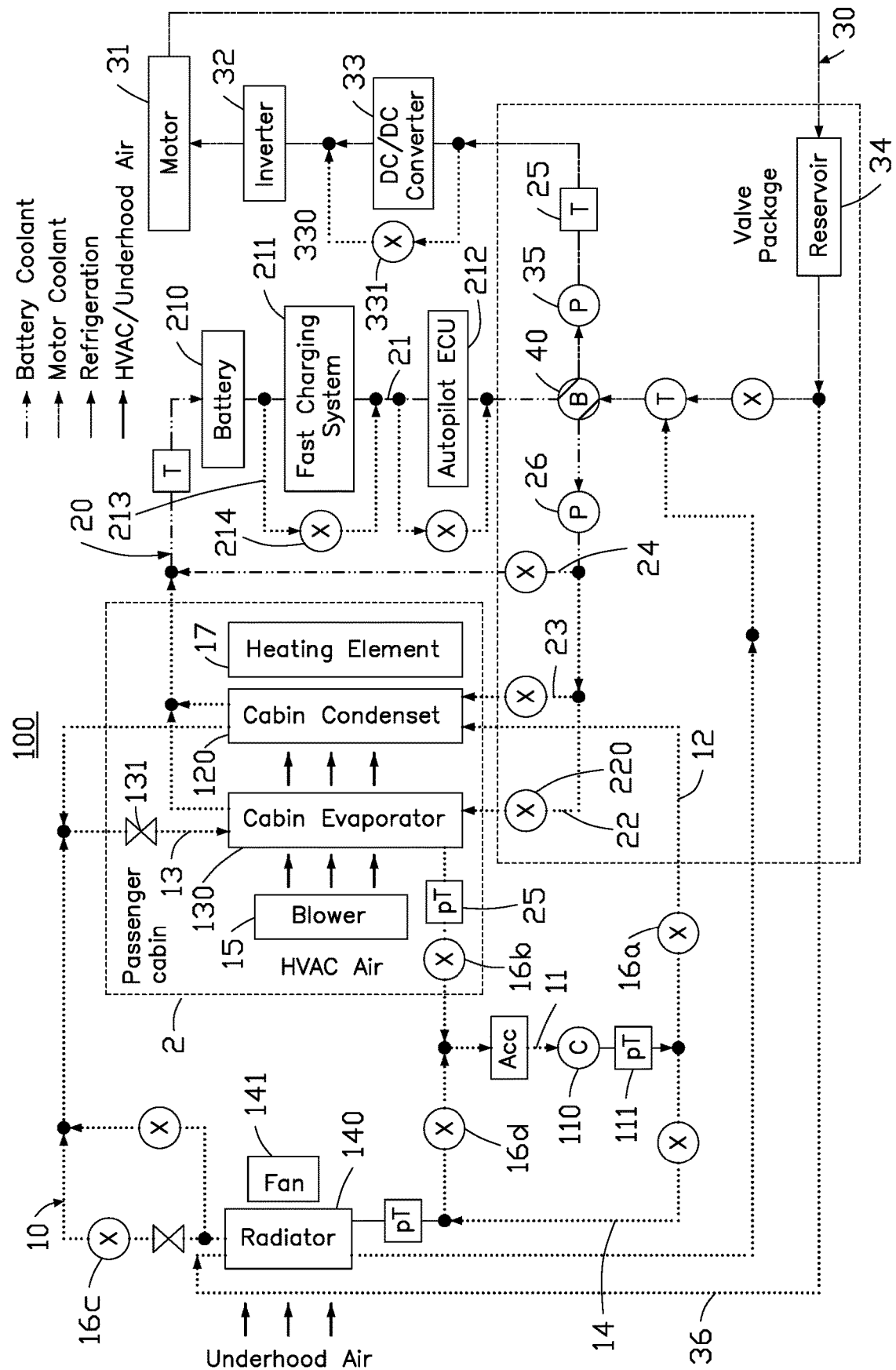
FIG. 23 is a diagrammatic view of the thermal management system of FIG. 1, operating in a battery energy conservation mode.

The thermal management system 100 can switch to the battery energy conservation mode at the ambient temperature higher than 5□ and lower than 30□. Referring to FIG. 23, different from the battery temperature uniformization mode, the coolant main-line 21 of the battery coolant loop 20 connects to the motor coolant loop 30 in series. Furthermore, the third coolant branch 24 does not connect to the coolant main-line 21. In this case, the waste heat of the coolant passing through the motor coolant loop 30 can be used to warm up the battery 210.

Dehumidification Mode

Figure 24:
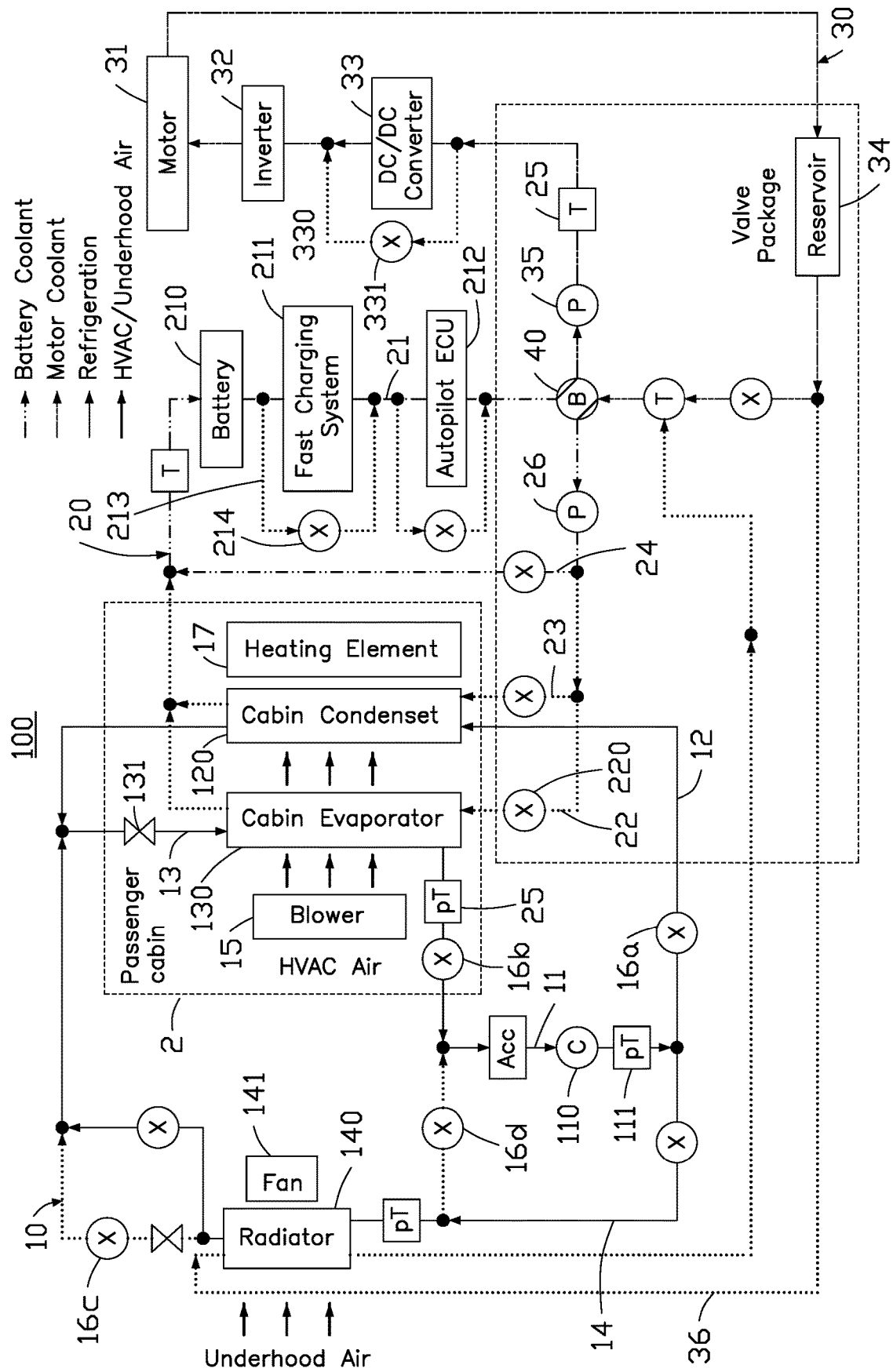
FIG. 24 is a diagrammatic view of the thermal management system of FIG. 1, operating in a dehumidification mode.

The thermal management system 100 can switch to the dehumidification mode at the ambient temperature higher than 15□ and lower than 30□. Referring to FIG. 24, different from the battery energy conservation mode, the first shut-off valves 16a, 16b, 16c and 16d are operated to cause the first refrigerant main-line 11, the second refrigerant main-line 12, the first refrigerant branch 13, and the second refrigerant branch 14 to communicate, so that the refrigerant at the downstream end of the first refrigerant main-line 11 splits into two portions, one portion guiding successively circulating in the first refrigerant main-line 11, the second refrigerant branch 14, and the first refrigerant branch 13, and the other portion successively circulating in the first refrigerant main-line 11, the second refrigerant main-line 12, and the first refrigerant branch 13. In this case, when the refrigerant passes through the cabin condenser 120, the refrigerant releases heat to the passenger cabin 2. In at least one embodiment, the air in the passenger cabin 2 may change phase from vapor to liquid when passing through the cabin evaporator 130 and then be expelled out of the passenger cabin 2, thus, the dehumidification mode can perform dehumidification of the air in the passenger cabin 2.

Thus, the humidity and the temperature of the passenger cabin 2 is optimized.

Winter Time Fast Charging Mode

Figure 25:
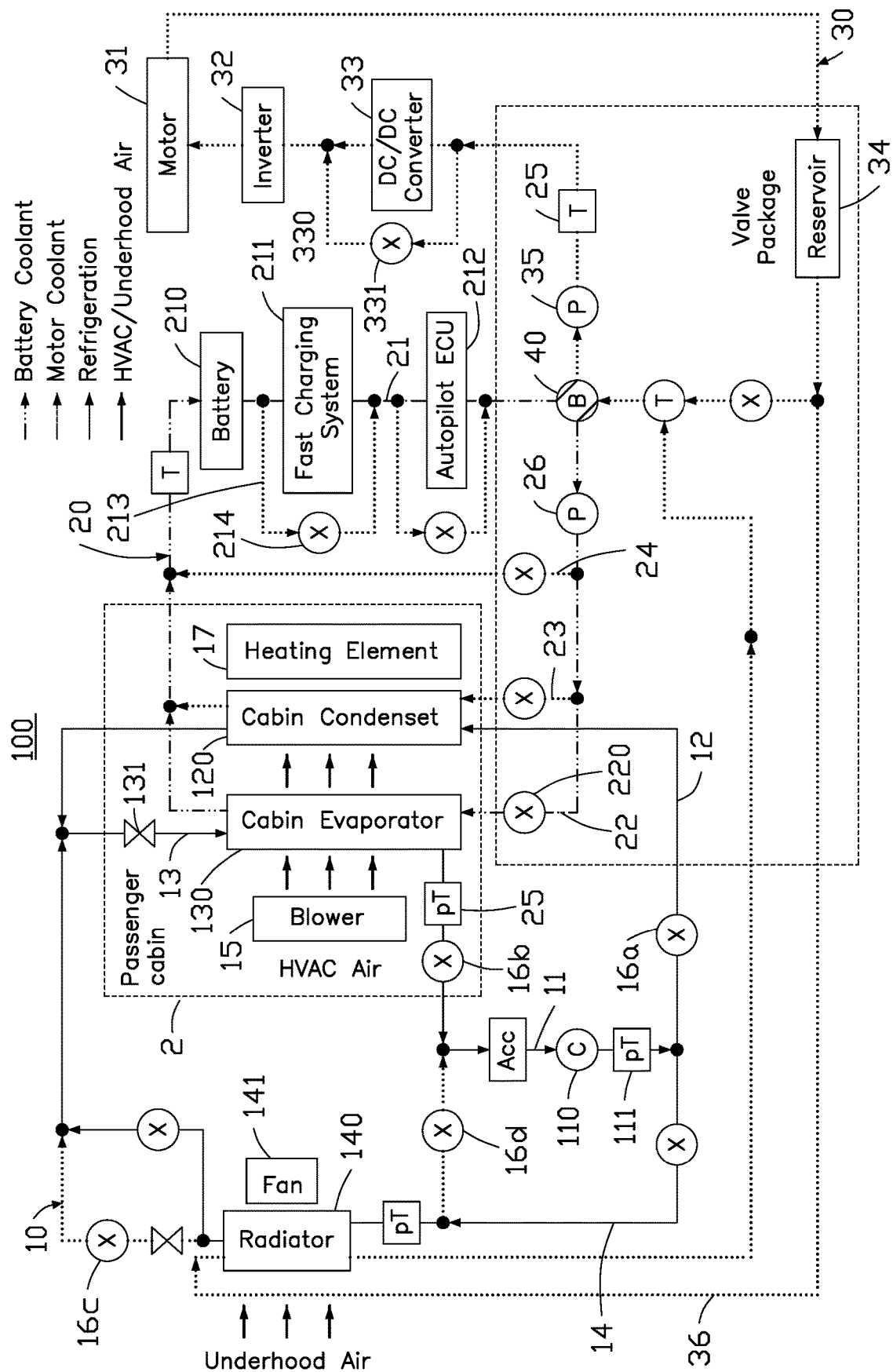
FIG. 25 is a diagrammatic view of the thermal management system of FIG. 1, operating in a winter time fast charging mode.

The thermal management system 100 can switch to the winter time fast charging mode, when the user stays in the passenger cabin 2 and waits for the charging of the battery 210 in winter, at the ambient temperature lower than 20□. Referring to FIG. 25, different from the dehumidification mode, each inlet of the four-way valve 40 is connected to one corresponding outlet to allow the coolant main-line 21 of the battery coolant loop 20 to connect to the motor coolant loop 30 in parallel. The first coolant branch 22, instead of the third coolant branch 24, communicates with the coolant main-line 21. In this case, the refrigerant passing through the cabin condenser 120 releases heat to the passenger cabin 2, so that the passenger cabin 2 is warmed up. Furthermore, the waste heat of the coolant circulating in the battery coolant loop 20 can be absorbed by the refrigerant passing through the cabin evaporator 130, so that the battery 210 is cooled. The waste heat in the battery coolant loop 20 can also be recycled to the radiator 140, which can be absorbed by the refrigerant passing through the radiator 140 and further released to the underhood air.

In this case, the powertrain system is not in need of cooling, so the coolant stops circulating in the motor coolant loop 30.

FIG. 26 illustrates an embodiment of an electric vehicle 1 including the thermal management system 100.

Each of the cabin condenser 120, the cabin evaporator 130, and the radiator 140 can function as a heat exchanger among three different fluids (that is, the air, the refrigerant, and the coolant). Heat transfer can be controlled among the three fluids to achieve desired temperatures. In cold weather, the waste heat generated by the power supply system and the powertrain system can be recycled to warm up the passenger cabin 2 and/or the battery 210. Thus, much less electrical energy is used to optimize the temperature of the passenger cabin 2 or the battery 210. Thus, the thermal management system 100 can increase the driving range of the electric vehicle 1.

Although the embodiments of the present disclosure have been shown and described, those having ordinary skill in the art can understand that changes may be made within the principles of the present disclosure, up to and including the full extent established by the broad general meaning of the terms used in the claims. It will, therefore, be appreciated that the embodiments described above may be modified within the scope of the claims.

What is claimed is:

1. A thermal management system applied in an electric vehicle, comprising:
   a refrigerant loop comprising:
      a first refrigerant main-line, a second refrigerant main-line, a first refrigerant branch, and a second refrigerant branch, wherein the first refrigerant main-line comprises a compressor, the second refrigerant main-line comprises a cabin condenser, the first refrigerant branch comprises a cabin evaporator, the cabin condenser and the cabin evaporator are configured to be in air communication with a passenger cabin of the electric vehicle, the second refrigerant branch comprises a radiator;
      a plurality of first shut-off valves operable between open and close to cause the first refrigerant main-line and the second refrigerant main-line to selectively communicate with one of the first refrigerant branch and the second refrigerant branch, thereby facilitating refrigerant to circulate in the refrigerant loop;
   a motor coolant loop facilitating coolant to circulate in the motor coolant loop;
   a battery coolant loop comprising a coolant main-line, a first coolant branch connected to the cabin evaporator, a second coolant branch connected to the cabin condenser, and a third coolant branch, wherein each of the first coolant branch, the second coolant branch, and the third coolant branch comprises a second shut-off valve, each of the second shut-off valve is operable between open and close to cause the coolant main-line to selectively communicate with at least one of the first coolant branch, the second coolant branch, and the third coolant branch, thereby facilitating the coolant to circulate in the battery coolant loop; and
   a four-way valve connecting the battery coolant loop to the motor coolant loop, wherein the four-way valve comprises two inlets and two outlets, each of the inlets is connected to one corresponding outlet to cause the battery coolant loop to connect to the motor coolant loop in series or in parallel.

2. The thermal management system of claim 1, wherein the first refrigerant main-line, the second refrigerant main-line, and the first refrigerant branch communicate to each other, the refrigerant loop further comprises a blower for blowing heat released by the cabin condenser across the passenger cabin; and
   the coolant main-line connects to the motor coolant loop in series, the first coolant branch connects the cabin evaporator to the coolant main-line.

3. The thermal management system of claim 2, wherein the refrigerant loop further comprises at least one heating element, the heating element is configured to heat air that flows to the passenger cabin.

4. The thermal management system of claim 2, wherein the third coolant branch connects to the coolant main-line.

5. The thermal management system of claim 2, wherein an airflow path is formed between the cabin evaporator and the cabin condenser.

6. The thermal management system of claim 1, wherein the first refrigerant main-line, the second refrigerant main-line, and the second refrigerant branch communicates with each other, the refrigerant loop further comprises a blower for blowing heat released by the cabin condenser across the passenger cabin, the radiator functions as an evaporator and absorbs heat from underhood air;
   the coolant main-line connects to the motor coolant loop in series, the third coolant branch connects to the coolant main-line.

7. The thermal management system of claim 6, further comprising one or more fans positioned in front of the radiator.

8. The thermal management system of claim 6, wherein the motor coolant loop further comprises a fourth coolant branch, the fourth coolant branch fluidically connects the radiator to the motor coolant loop.

9. The thermal management system of claim 1, wherein the first refrigerant main-line, the second refrigerant main-line, and the second refrigerant branch communicates with each other, the refrigerant loop further comprises a blower for blowing heat released by the cabin condenser across the passenger cabin, the radiator functions as an evaporator and absorbs heat from underhood air; and
   the coolant main-line connects to the motor coolant loop in series, the second coolant branch connects the cabin condenser to the coolant main-line.

10. The thermal management system of claim 1, wherein the first refrigerant main-line, the second refrigerant main-line, and the first refrigerant branch communicate to each other, the refrigerant loop further comprises a blower for blowing heat released by the cabin condenser across the passenger cabin; and
    the coolant main-line connects to the motor coolant loop in series, the second coolant branch connects the cabin condenser to the coolant main-line, the third coolant branch connects to the coolant main-line.

11. The thermal management system of claim 1, wherein the first refrigerant main-line, the second refrigerant main-line, and the second refrigerant branch communicates with each other, the refrigerant loop further comprises a blower for blowing heat released by the cabin condenser across the passenger cabin, the radiator functions as an evaporator and absorbs heat from underhood air;

the coolant main-line connects to the motor coolant loop in parallel, the second coolant branch connects the cabin condenser to the coolant main-line;

the motor coolant loop further comprises a fourth coolant branch, the fourth coolant branch fluidically connects the radiator to the motor coolant loop.

12. The thermal management system of claim 1, wherein the first refrigerant main-line, the second refrigerant main-line, and the first refrigerant branch communicate to each other;

the coolant main-line connects to the motor coolant loop in series, the first coolant branch connects the cabin evaporator to the coolant main-line, the second coolant branch connects the cabin condenser to the coolant main-line.

13. The thermal management system of claim 1, wherein the first refrigerant main-line, the second refrigerant main-line, and the second refrigerant branch communicates with each other, the radiator functions as an evaporator and absorbs heat from underhood air;

the coolant main-line connects to the motor coolant loop in series, the second coolant branch connects the cabin condenser to the coolant main-line.

14. The thermal management system of claim 1, wherein the first refrigerant main-line, the second refrigerant main-line, and the second refrigerant branch communicates with each other, the refrigerant loop further comprises a blower for blowing heat released by the cabin condenser across the passenger cabin, the radiator functions as an evaporator;

the coolant main-line connects to the motor coolant loop in series, the third coolant branch connects the cabin evaporator to the coolant main-line; and the fourth coolant branch fluidically connects the radiator to the motor coolant loop.

15. The thermal management system of claim 14, wherein at least one opening is defined surrounding the cabin evaporator to expel cool air out of the passenger cabin.

16. The thermal management system of claim 1, wherein the first refrigerant main-line, the second refrigerant main-line, and the second refrigerant branch communicates with each other, the refrigerant loop further comprises a blower for blowing heat released by the cabin condenser across the passenger cabin, the radiator functions as an evaporator and absorbs heat from underhood air; and the coolant main-line connects to the motor coolant loop in series, the first coolant branch connects the cabin evaporator to the coolant main-line.

17. The thermal management system of claim 16, wherein the first refrigerant branch communicates with the first refrigerant main-line and the second refrigerant main-line.

18. The thermal management system of claim 1, wherein the battery coolant loop comprises a battery, a fast charging system, and an autopilot electronic control unit (ECU), the battery coolant loop is configured to circulate the coolant through the battery, the fast charging system, and the autopilot ECU; and the motor coolant loop comprises a motor, an inverter, a DC/DC converter, the motor coolant loop is configured to circulate the coolant through the motor, the inverter, the DC/DC converter.

19. The thermal management system of claim 18, wherein the motor coolant loop further comprises a bypass path connected to DC/DC converter, the bypass path comprises a third shut-off valve, which is operable between open and close to allow the coolant to pass through or bypass the DC/DC converter;

the battery coolant loop further comprises two bypass paths connected to the fast charging system and the autopilot ECU, each of the bypass paths comprises a third shut-off valve, each of the third shut-off valve is operable between open and close to allow the coolant to pass through or bypass the fast charging system and the autopilot ECU.

20. An electric vehicle comprising:
a passenger cabin; and
a thermal management system comprising:
a refrigerant loop comprising:
a first refrigerant main-line, a second refrigerant main-line, a first refrigerant branch, and a second refrigerant branch, wherein the first refrigerant main-line comprises a compressor, the second refrigerant main-line comprises a cabin condenser, the first refrigerant branch comprises a cabin evaporator, the cabin condenser and the cabin evaporator being in air communication with the passenger cabin, the second refrigerant branch comprises a radiator;
a plurality of first shut-off valves operable between open and close to cause the first refrigerant main-line and the second refrigerant main-line to selectively communicate with one of the first refrigerant branch and the second refrigerant branch, thereby facilitating refrigerant to circulate in the refrigerant loop;
a motor coolant loop facilitating coolant to circulate in the motor coolant loop;
a battery coolant loop comprising a coolant main-line, a first coolant branch connected to the cabin evaporator, a second coolant branch connected to the cabin condenser, and a third coolant branch, wherein each of the first coolant branch, the second coolant branch, and the third coolant branch comprises a second shut-off valve, each of the second shut-off valve is operable between open and close to cause the coolant main-line to selectively communicate with at least one of the first coolant branch, the second coolant branch, and the third coolant branch, thereby facilitating the coolant to circulate in the battery coolant loop; and
a four-way valve connecting the battery coolant loop to the motor coolant loop, wherein the four-way valve comprises two inlets and two outlets, each of the inlets is connected to one corresponding outlet to cause the battery coolant loop to connect to the motor coolant loop in series or in parallel.

* * * * *